(12) United States Patent
De Bruyker et al.

(10) Patent No.: US 8,393,785 B2
(45) Date of Patent: Mar. 12, 2013

(54) NANOCALORIMETER BASED ON THERMAL PROBES

(75) Inventors: Dirk De Bruyker, San Jose, CA (US);
Francisco E. Torres, San Jose, CA (US);
Michal V. Wolkin, Los Altos Hills, CA (US); Gregory B. Anderson, Emerald Hills, CA (US); Eugene M. Chow, Fremont, CA (US)

(73) Assignee: Palo Alto Research Center Incorporated, Palo Alto, CA (US)

( * ) Notice: Subject to any disclaimer, the term of this patent is extended or adjusted under 35 U.S.C. 154(b) by 800 days.

(21) Appl. No.: 12/467,072

(22) Filed: May 15, 2009

(65) Prior Publication Data

US 2010/0290501 A1  Nov. 18, 2010

Related U.S. Application Data

(60) Provisional application No. 61/178,330, filed on May 14, 2009.

(51) Int. Cl.
*G01N 25/20* (2006.01)
*G01K 17/04* (2006.01)

(52) U.S. Cl. ............... 374/31; 374/12; 374/29; 422/51; 436/147

(58) Field of Classification Search ............... 374/31–39, 374/10–12, 208, 29; 422/51; 436/147
See application file for complete search history.

(56) References Cited

U.S. PATENT DOCUMENTS

| | | | |
|---|---|---|---|
| 3,717,798 A | 2/1973 | Kahn | |
| 4,928,513 A | 5/1990 | Sugihara et al. | |
| 5,048,336 A | 9/1991 | Sugihara et al. | |
| 6,031,231 A * | 2/2000 | Kimata et al. | 250/332 |
| 6,096,559 A | 8/2000 | Thundat et al. | |
| 6,734,425 B2 | 5/2004 | Hantschel | |
| 6,895,645 B2 | 5/2005 | Xu et al. | |
| 6,973,722 B2 | 12/2005 | Hantschel et al. | |
| 7,082,684 B2 | 8/2006 | Hantschel | |
| 7,141,210 B2 | 11/2006 | Bell et al. | |
| 7,147,763 B2 | 12/2006 | Elrod et al. | |
| 7,230,440 B2 | 6/2007 | Hantschel et al. | |
| 7,241,420 B2 | 7/2007 | Hantschel et al. | |
| 7,344,906 B2 | 3/2008 | Chua et al. | |
| 7,356,920 B2 | 4/2008 | Hantschel et al. | |
| 7,413,706 B2 | 8/2008 | Peeters | |
| 7,416,897 B2 | 8/2008 | Bruce | |
| 7,419,835 B2 | 9/2008 | Torres | |
| 7,473,030 B2 * | 1/2009 | Bruce et al. | 374/31 |
| 7,473,031 B2 | 1/2009 | Wolkin et al. | |
| 7,497,613 B2 | 3/2009 | King et al. | |
| 7,521,253 B2 | 4/2009 | Bruce | |
| 7,754,492 B2 | 7/2010 | Bell | |

(Continued)

OTHER PUBLICATIONS

Recht et al., "Enthalpy Array Analysis of Enzymatic and Binding Reactions", Analytical Biochemistry, 377(1), Jun. 1, 2008, pp. 33-39.

(Continued)

*Primary Examiner* — Gail Verbitsky
(74) *Attorney, Agent, or Firm* — Fay Sharpe LLP

(57) ABSTRACT

A nanocalorimeter includes a merging layer having, a drop placement area for holding drops to be merged and a thermal equilibration area. A measurement layer includes a substrate, and a temperature probe on the substrate, wherein the temperature probe extends out of the surface of the substrate to come into operative contact with the thermal equilibration area when the measurement layer is placed in operative association with the merging layer. The nanocalorimeter is configured to have the merging layer and the measurement layer non-integrated, making the measurement layer reusable.

20 Claims, 21 Drawing Sheets

U.S. PATENT DOCUMENTS

| | | | |
|---|---|---|---|
| 7,816,146 B2 * | 10/2010 | Wolkin et al. | 436/147 |
| 7,833,800 B2 * | 11/2010 | Bell et al. | 436/147 |
| 2005/0265898 A1 * | 12/2005 | Bell et al. | 422/82.01 |
| 2006/0132542 A1 | 6/2006 | De Bruyker | |
| 2006/0159585 A1 * | 7/2006 | Torres et al. | 422/51 |
| 2007/0065934 A1 * | 3/2007 | Torres et al. | 435/287.1 |
| 2007/0147473 A1 * | 6/2007 | Wolkin et al. | 374/208 |
| 2007/0148416 A1 * | 6/2007 | Wolkin et al. | 428/195.1 |
| 2009/0249521 A1 | 10/2009 | Dazzi et al. | |
| 2010/0216669 A1 | 8/2010 | Hantschel et al. | |
| 2010/0289613 A1 | 11/2010 | De Bruyker et al. | |

OTHER PUBLICATIONS

Recht et al., "Measurement of Enzyme Kinectics and Inhibitor Constants Using Enthalpy Arrays", Analytical Biochemistry, 388(2), May 15, 2009, pp. 204-212.

Recht et al., "Application of Enthalpy Arrays to Fragment-based Screening", Fragment-Based Lead Discovery Conference, 2008, San Diego, CA.

Recht et al., "Enzymatic Assays for Fragment-Based Screening Using Enthalpy Arrays", Drug Discovery Conference: Fragment-Based Techniques Conference, 2009, San Diego, CA.

Vettiger, et al., Ultrahigh Density, High-Data-Rate NEMS-Based AFM Storage System, Microelectronic Engineering, vol. 46, No. 1-4, pp. 101-104.

Chua et al., "Out-of Plane High-Q Inductors on Low Resistance Silicon" IEEE/ASME Journal of Microelectromechanical Systems, 12, 2003, pp. 989-995.

Hantschel et al., "Fabrication of Highly Conductive Stressed-Metal Springs and their Use as Sliding Contact Interconnects", Microelectronic Engineering, 67-69 (2003), pp. 690-695.

Rosa et al., A Novel External Electrode Configuration for the Electrostatic Actuation of MEMS Based Devices, IOP Journal of Micromechanics and Miroengineering, 14 (2004), pp. 446-451.

Dau et al., A dual axis gas gyroscope utilizing low-doped silicon thermistor, Proc. IEEE MEMS, 2005, Miami, p. 626.

Kuznetsov et al., "High Temperature Coefficient of Resistance in Vanadium Oxide Diodes", Review of Scientific Instruments, 68, 1997, pp. 1518.

StressedMetal MEMS Solutions, Palo Alto Research Center, 2002, 1 pgs., http://www.parc.com/research/projects/stressedmetal/.

COMSOL Multiphysics, http://en.wikipedia.org/wiki/COMSOL_Multiphysics, downloaded from the Internet May 2, 2009, pp. 1-2.

De Bree et al., the Microflown: a novel device measuring acoustical flows, Sensors and Actuators: A Physical, vol. SNA054/1-3, pp. 552-557, 1996.

Price et al., Micro-Thermal Analysis: Scanning Thermal Microscopy and Localised Thermal Analysis, Int. J. Pharm., 192, pp. 85-96.

Fiege et al., Thermal characterization of power devices by scanning thermal microscopy techniques, Microelectronics Reliability, vol. 39, p. 1149, 1999.

Sanders et al., Discrimination of Polymorphic Forms of a Drug Product by Localized Thermal Analysis, Journal of Microscopy, vol. 198, Pt. 2, May 2000, pp. 77-81.

Marini et al., Physico-Chemical Characterization of Drugs and Drug Forms in the Solid State, Current Medicinal Chemistry—Anti-Infective Agents, Dec. 2003, vol. 2, No. 4, pp. 303-321.

Recht et al., "Enthalpy Arrays for Enzymatic Assays in Fragment-Based Screening", to be presented at Assay Development & Screening Technologies Conference, San Francisco, CA, 2009.

Linder et al., "Stressed Metal Nanosprings", PennWell Corp., Advanced Packaging, vol. 11, Issue 11, 2002.

* cited by examiner

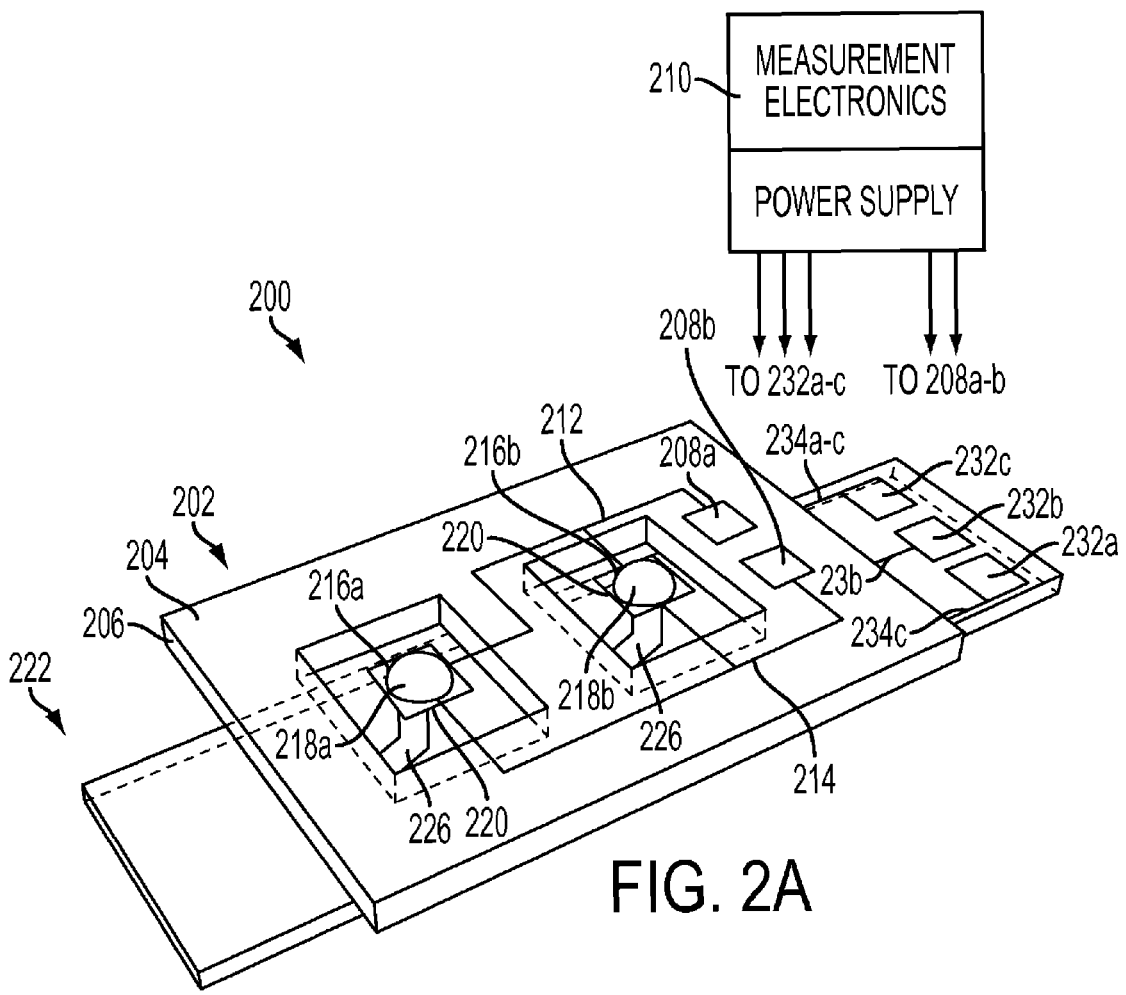

NANOCALORIMETER BASED ON THERMAL PROBES

This application claims the benefit of priority to U.S. Provisional Patent Application No. 61/178,330, filed May 14, 2009, entitled "Nanocalorimeter Based On Thermal Probes", by Dirk De Bruyker et al., the disclosure of which is hereby incorporated by reference in its entirety.

STATEMENT REGARDING FEDERALLY SPONSORED RESEARCH OR DEVELOPMENT

This invention was made with the United States Government support under Cooperative Agreement No. R01GM077435 awarded by the National Institute of Health (NIH). The United States Government has certain rights in the invention.

INCORPORATION BY REFERENCE

U.S. Pat. No. 7,521,253, titled, Method for multiple target assay for drug discovery; U.S. Pat. No. 7,473,031, titled, Resistive thermal sensing; U.S. Pat. No. 7,473,030, titled, Thermal sensing; U.S. Pat. No. 7,419,835, titled, Screening for ligand binding at specific target sites; U.S. Pat. No. 7,416,897, titled, Method for high-throughput screening assay sample preparation and analysis; U.S. Pat. No. 7,413,706, titled, Replaceable parylene membranes for nanocalorimeter; U.S. Pat. No. 7,147,763, titled, Apparatus and method for using electrostatic force to cause fluid movement; U.S. Pat. No. 7,141,210, titled, Apparatus and method for a nanocalorimeter for detecting chemical reactions; U.S. Pat. No. 7,230,440, titled, Curved spring structure with elongated section located under cantilevered section; U.S. Pat. No. 7,082,684, titled, Intermetallic spring structure; U.S. Pat. No. 6,973,722, titled, Release height adjustment of stress metal device by annealing, before and after release and U.S. Pat. No. 6,895,645, titled, Methods to make bimorph MEMS devices; and U.S. Patent Applications: U.S. Ser. No. 11/018,757 (U.S. Patent Application Publication Number: 2006/0132542), titled, Apparatus and method for improved electrostatic drop merging; U.S. Ser. No. 11/167,612 (U.S. Patent Application Publication No. 2005/0254994), titled, Thermal Sensing With Bridge Circuitry; Ser. No. 11/167,635 (U.S. Patent Application Publication No. 2005/0265898), entitled Thermal Sensing; and U.S. Patent Application (Atty. Dkt. No. 20060033-US-NP, Vanadium Oxide Thermal Microprobes filed May 15, 2009, are each hereby incorporated herein by reference in their entireties.

BACKGROUND

This application relates generally to an apparatus and method for an improved nanocalorimeter, and more specifically, to an improved nanocalorimeter for measuring the heat released or absorbed during chemical reactions.

Calorimetry is used to measure enthalpic changes, including enthalpic changes arising from reactions, phase changes, changes in molecular conformation, temperature variations, and other variations of interest that may occur for a particular specimen. By measuring enthalpic changes over a series of conditions, other thermodynamic variables may be deduced. For example, measurements of enthalpy as a function of temperature reveal the heat capacity of a specimen, and titrations of reacting components can be used to deduce the binding constant and effective stoichiometry for a reaction. Calorimetry measurements are useful in a broad variety of applications, including, for example, pharmaceuticals (drug discovery, decomposition reactions, crystallization measurements), biology (cell metabolism, drug interactions, fermentation, photosynthesis), catalysts (biological, organic, or inorganic), electrochemical reactions (such as in batteries or fuel cells), and polymer synthesis and characterization, to name a few. In general, calorimetry measurements can be useful in the discovery and development of new chemicals and materials of many types, as well as in the monitoring of chemical processes. Standard calorimeters require relatively large samples (typically about 0.2 ml to 10 liters) and usually measure one sample at a time. As such, these systems cannot be used to measure very small samples, as might be desired for precious or highly reactive materials. Furthermore, standard calorimeters cannot be used effectively to monitor a large number of reactions of small sample size in parallel, as is required in order to perform studies using combinatorial chemistry techniques.

In recent years, researchers and companies have turned to combinatorial methods and techniques for discovering and developing new compounds, materials, and chemistries. Consequently, there is a need for tools that can measure reactions and interactions of large numbers of small samples in parallel, consistent with the needs of combinatorial discovery techniques. Preferably, users desire that these tools enable inexpensive measurements, minimize sample volumes and minimize contamination and cross-contamination problems.

There is therefore a great interest in developing nanocalorimeter devices that require very small volumes of sampled media for accurate detection and measuring of biochemical reactions.

Nanocalorimeters have been proposed, such for example those discussed in the previously incorporated by reference patents and patent applications, including U.S. Pat. No. 7,147,763, titled Apparatus and method for using electrostatic force to cause fluid movement and U.S. Pat. No. 7,141,210, titled, Apparatus and method for a nanocalorimeter for detecting chemical reactions.

It is therefore considered that additional advances to the concepts previously disclosed would be useful in bringing a cost effective, highly accurate nanocalorimeter device into mainstream use.

BRIEF DESCRIPTION

A nanocalorimeter includes a merging layer having, a drop placement area for holding drops to be merged and a thermal equilibration area. A measurement layer includes a substrate, and a temperature probe on the substrate, wherein the temperature probe extends out of the surface of the substrate to come into operative contact with the thermal equilibration area when the measurement layer is placed in operative association with the merging layer. The nanocalorimeter is configured to have the merging layer and the measurement layer non-integrated, making the measurement layer reusable.

BRIEF DESCRIPTION OF THE DRAWINGS

FIGS. 2A and 2B are illustrations of a non-integrated nanocalorimeter device;

DETAILED DESCRIPTION

Figure 1A:
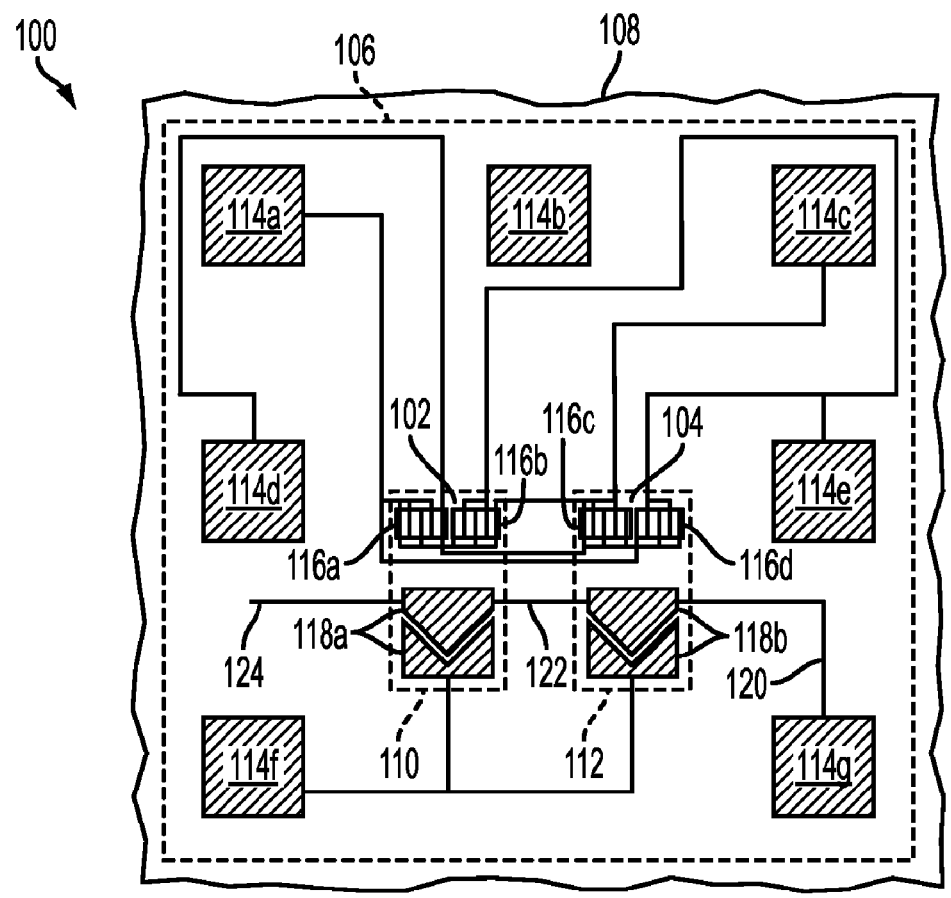
FIGS. 1A and 1B are illustrations of a integrated nanocalorimeter device.

Calorimetry is a powerful method for characterizing biochemical interactions. It does not require labeling or immobilization of reagents, so concerns about the effects of such modifications on the behavior of the reagents are eliminated. At the same time, assay development time and cost can be minimized because neither labeling nor immobilization protocols need to be established. For binding reactions, calorimetry can be used to provide a complete thermodynamic characterization. However, as mentioned in the Background, the use of conventional calorimetry is limited by large sample requirements and low throughput. Enthalpy array technology to enable calorimetry on a scale 200-times smaller than available with commercially available state of the art systems, which substantially reduces reagent costs has been developed. See for example, U.S. Pat. Nos. 7,147,763 and 7,141,210. By enabling parallel measurements, these approaches also reduce the measurement time by 100-fold. Both of these advantages are important in screening studies and other investigations requiring a large number of measurements.

Previous efforts in the nanocalorimeter area have focused on improving the detection sensitivity so that the technology can be used in a variety of valuable applications. While substantial progress has been made and the detection sensitivity has increased 100-times, additional improvements are needed to extend the application space.

Particularly, existing designs have focused on configurations with thermal sensors (e.g., thermistors) integrated directly with the merging arrays. In such designs an extensive thin film process sequence is required to build such nanocalorimeter devices (e.g., sputtering of thermistor layer, PECVD deposition of barrier layers etc.). Low noise pogo pin contacts are required, which also puts demands on the fabrication, e.g. needing to etch parylene, preventing the pads from becoming compromised during fabrication, especially during application of adhesion promoter for parylene, and making sure that the electrical path to the thermistors is completely ohmic and does not introduce additional electronic noise. It is to be understood the use of "thermal sensor" such as a thermistor is for measuring of temperature. Therefore any device or material which accomplishes such measurements, such as thermometers, thermocouples, thermopiles, metal resistance temperature detectors (RTDs), among others, are also to be considered a thermal sensor.

Since the arrays are made with a thin low temperature resistant material, such as but not limited to a plastic film, in order to provide thermal isolation of the thermal sensors, the fabrication conditions, and especially the maximum fabrication temperature are limited. Currently thermistors used in existing nanocalorimeter devices are therefore fabricated using a relatively low temperature process. For example, in one embodiment the thermistors are vanadium oxide thermistors made using a relatively low temperature process. It has been found, however, that more sensitive thermistors could be fabricated on thick glass substrates out of p+ amorphous silicon. But these more sensitive thermistors cannot be successfully fabricated on the low temperature materials as high temperatures destroy these materials.

Additionally, there is evidence the vanadium oxide thermistors could be made more sensitive if higher temperature fabrication were possible. Thus, the present application discloses a nanocalorimeter device and a process for making a nanocalorimeter device which moves the thermal sensors off the merging array and onto thin cantilevers that contact the underside of the merging array during measurements. The process for making the cantilever-based thermal sensors enables higher temperature fabrication for more sensitive thermal sensors, as well as enabling tighter tolerances that will result in better balanced resistivity, an additional avenue for sensitivity improvement. In addition to the use of vanadium oxide for forming thermal sensors, there are other materials which may be used including ceramic mixtures of iron oxide and zinc magnesium chromate, as only some examples.

Moving the thermal sensors off the drop merging array also reduces the cost of the drop merging arrays. The cost for making drop merging arrays with integrated thermal sensors is high, and such expensive arrays can only be used a limited number of times.

In use, the drop merging arrays have reagent drops deposited and merged on them, so the arrays have to be cleaned, stripped of their hydrophobic outer layer by solvent, and recoated after each use. Individual detector sites on the arrays can fail during each measurement-cleaning-stripping-recoating cycle, and after 4 to 5 uses the array becomes unusable. Moving the thermal sensors off the drop merging arrays and onto cantilevers makes the thermal sensors a reusable part of the measurement structure. This lowers the cost of the merging arrays by an order of magnitude since, in one embodiment, the drop merging array will reduce to a drop merging layer having a plastic film with a metal pattern on its top and bottom sides and a hydrophobic top layer resulting in a much simpler construction. Thermal sensors on cantilevers, in the form of temperature probes, will not be contaminated during use nor damaged during array cleaning and reconditioning. Thus, the cost of the detectors will be amortized over a much larger number of measurements, making the measurements much less expensive.

Figure 1B:
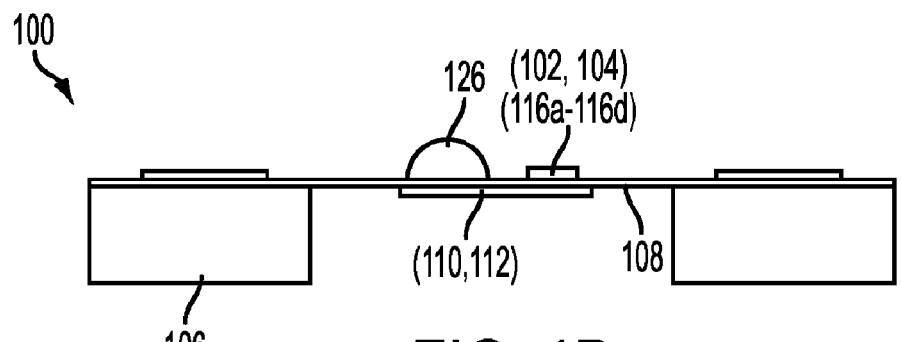

FIGS. 1A and 1B illustrate a section of a nanocalorimeter (e.g., a thermal sensing cell) 100 which has a drop merging array and thermal sensors integrated together. More particularly, the thermal sensing cell 100 includes two pairs of thermal sensors 102, 104. Frame 106 supports a polymer layer 108 from underneath. In addition, thermal equilibration areas 110 and 112, whose back side portions are also described here as backplane islands (shown in FIG. 1B and as dashed lines in FIG. 1A) are on the underside of polymer layer 108, each implemented as thermally conductive components.

Frame 106 can be formed from 1 mm thick stainless steel with appropriate holes made therein, and where thermal equilibration areas 110 and 112 are aligned and located within the holes. This design provides thermal isolation between thermal equilibration areas 110 and 112 as well as between either of the thermal equilibration areas and frame 106. It is noted that thermal isolation could be maintained in various other ways.

Contact pads 114a-114g are located on the upper surface of polymer layer 108 over frame 106. Each contact pad (except contact pad 114b) is connected to one or more of the components over thermal equilibration areas 110 and 112 by electrical leads (or conductive lines) that are shown schematically in FIG. 1A. If cell 100 is approximately square with 9 mm sides, the contact pads can be approximately 1 mm×1 mm, allowing connection with pogo pins. The leads can be approximately 50 µm wide or even wider as long as they do not result in loss of thermal isolation.

Thermal sensors 102, 104 can be implemented as two thermistor pairs, one with slabs 116a and 116b and the other with slabs 116c and 116d. The contact pads 114a-114g can be connected in various ways to provide an implementation of a Wheatstone bridge or other appropriate arrangement.

FIG. 1A also depicts drop mergers 118a and 118b, on one of which a reaction can be caused and differential temperature measurement performed (e.g., a sample drop merging area). The other drop merger may act as a reference drop merging area. Drop mergers 118a and 118b illustratively have chevron shaped features, but could also be implemented by any of the techniques described in co-pending U.S. patent application Ser. No. 11/018,757 entitled, "Apparatus and Method for Improved Electrostatic Drop Merging and Mixing", incorporated by reference herein in its entirety. Conductive line 120 extends from pad 114g to the upper part of drop merger 118b, with conductive line 122 extending between the upper parts of drop mergers 118a and 118b, and conductive line 124 extending leftward from the upper part of drop merger 118a to provide some symmetry with conductive line 120. Pad 114f is connected to the lower parts of both drop mergers. Description of features shown in FIG. 1A that relate to reducing offset voltage are described in co-pending U.S. patent application Ser. No. 11/167,612 (now published as U.S. Patent Application Publication No. 2005/0254994), entitled "Thermal Sensing With Bridge Circuitry" and incorporated herein by reference in its entirety. Description of features shown in FIG. 1A that relate to providing signals through contact pads and electrical detection through contact pads are described in co-pending U.S. patent application Ser. No. 11/167,635 (now published as U.S. Patent Application Publication No. 2005/0265898), entitled "Thermal Sensing" and incorporated herein by reference in its entirety.

In FIGS. 1A and 1B, heat conducts from drop 126 downwards through the plastic PEN film 108, along the copper thermal equilibration areas (110,112), and back up through the PEN film 108 to the thermistors (116a-116d or i.e., thermistor pairs 102,104).

Figure 2B:
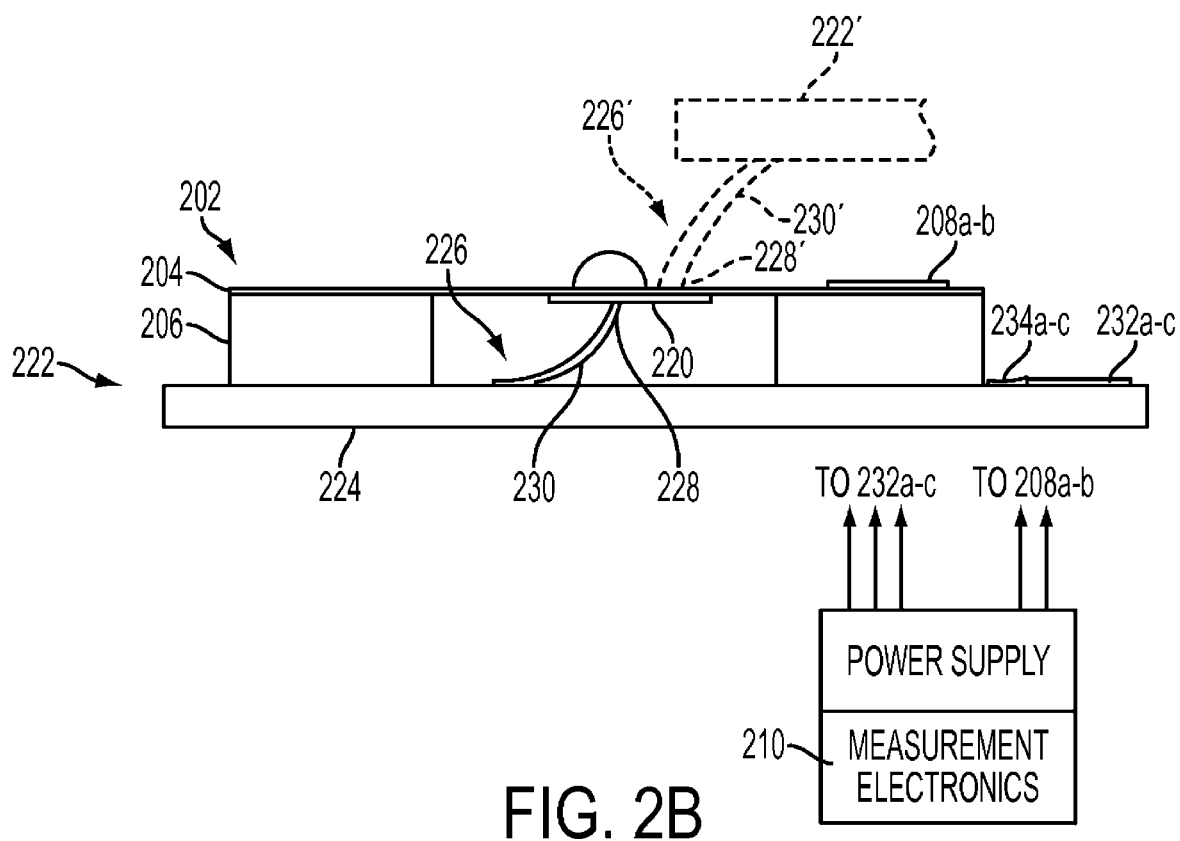

FIGS. 2A and 2B depict a portion of a non-integrated nanocalorimeter (e.g., a thermal sensing cell) 200, according to the concepts of the present application. This embodiment includes a drop merging layer 202, having a thin thermally insulating substrate (e.g., plastic film, Kapton membrane, PEN membrane, or other appropriate thermally insulating material) 204 carried on a frame (or stiffener) 206. On the surface of thin substrate 204 are activation contact pads 208a and 208b arranged to receive energy (from a power source 210) to implement the merging operation. Conductive lines 212 and 214 are formed to carry the activation energy, to drop mergers (or drop merging areas) 216a and 216b which receive the energy from conductive lines 212 and 214 to perform a merging operation to form drops 218a and 218b. Drop merging layer 202 also includes thermal equilibration areas 220. The thermal equilibration areas are thermally conductive areas of the merging layer 202 that conduct heat well enough that lateral temperature non-uniformities are minimized across the drop merging areas.

Merging layer 202 as described in these embodiments is constructed to allow the merging of drops appropriately placed on its surface, and provides sufficient thermal isolation of the drops for measurement of heat generated by the merging operation. In addition to performing the merging of the drops by electrostatic action, merging may be accomplished in a number of other ways, including having a stir bar in each drop and using the turning on of an electromagnet to actuate merging, having a stir bar in only one drop but not placed at the center of magnetic mixing, so the stir bar moves when an electromagnet is turned on in a way to merge the drop with another drop, or starting a reaction by going from dark to light, when the drops contain cells that increase their metabolism in the presence of light or reactions that are initiated by light (e.g. UV polymerization), among others.

A bottom (or measurement) layer 222 of device 200 includes a substrate 224 which carries cantilever temperature probes 226, which in one embodiment has a thermal sensor 228 carried on a tip of cantilever body 230. Also carried on measurement layer 222 are temperature measurement contact pads 232a-232c and conductive lines 234a-234c which connect the cantilever thermistor probes 226 to the temperature measurement contact pads 232a-232c. As illustrated by FIGS. 2A and 2B, the independent construction of the drop merging layer 202 and layer 222 separates the surface of the thin substrate 204 (which carries the drop mergers 216a and 216b) and cantilever temperature probes 226 from each other.

In this embodiment the thermal sensor is on the tip of a ≈3 µm thin cantilever that is located in operative contact with the backplane island portion of thermal equilibration area 220. It is to be understood that operative contact includes having the thermal sensor 228 in actual physical contact with the thermal equilibration area, as well as coming within sufficient proximity of the thermal equilibration area 220 to allow for the transfer of heat but without actual physical contact with the thermal equilibration areas. In some embodiments this close proximity is achieved when the thermal sensor is within less than 1 micron to approximately 5 microns from the thermal equilibration area. Heat is transferred to thermal equilibration area 220 and is sensed by thermal sensor 228 carried on cantilever 230, and is then passed to measurement electronics 210.

Heat conduction along the cantilever is small compared with the heat conduction through the air because the cantilever is kept thin, so the thermal time constant of the detector is not reduced, as desired. COMSOL® calculations presented below provide more detail. COMSOL® is a registered trademark of COMSOL AB Corporation of Sweden, for a finite element analysis and solver software package for various physics and engineering applications.

Commonly the non-integrated nanocalorimeter devices of the present discussion will employ two or four cantilever temperature probes with a merging area (i.e., one or two probes with the sample merging area and one or two probes with the reference merging area). However, the described nanocalorimeter may also be configured with a single temperature probe, if for example the drop merging area did not include or use the reference merging area and rather only employed the sample merging area. It is also to be understood that when talking about the drop merging area, there will be multiple merging areas on a device when the nanocalorimeter device is constructed as an array of merging areas carried on drop merging layer 202, with corresponding temperature probes associated with the separate measurement layer 222.

With continuing attention to FIG. 2B illustrated in dotted line is a further embodiment of the present application. The dotted lines are not shown in FIG. 2A for clarity of that figure.

As the drop merging layer and the measurement layer are separate non-integrated layers, it is also possible to have the operative association between the two layers occur on the front side of the drop merging layer 202. Thus, as shown in the dotted lines of FIG. 2B, a measurement layer 222 has a cantilevered temperature probe 226', including a thermal sensor 228' located on the tip of a cantilever or probe 230'. Then measurement layer 222', is moved into operative association with the drop carrying side of drop merging layer 202, so that the thermal sensor 228' is in operative contact with thermal equilibration area 220 of drop merging layer 202. Of course in this embodiment the, to be discussed, cap layer would need to be redesigned, the measurement layer itself could be designed to also function as the cap layer, or no cap layer could be used.

Figure 3A:
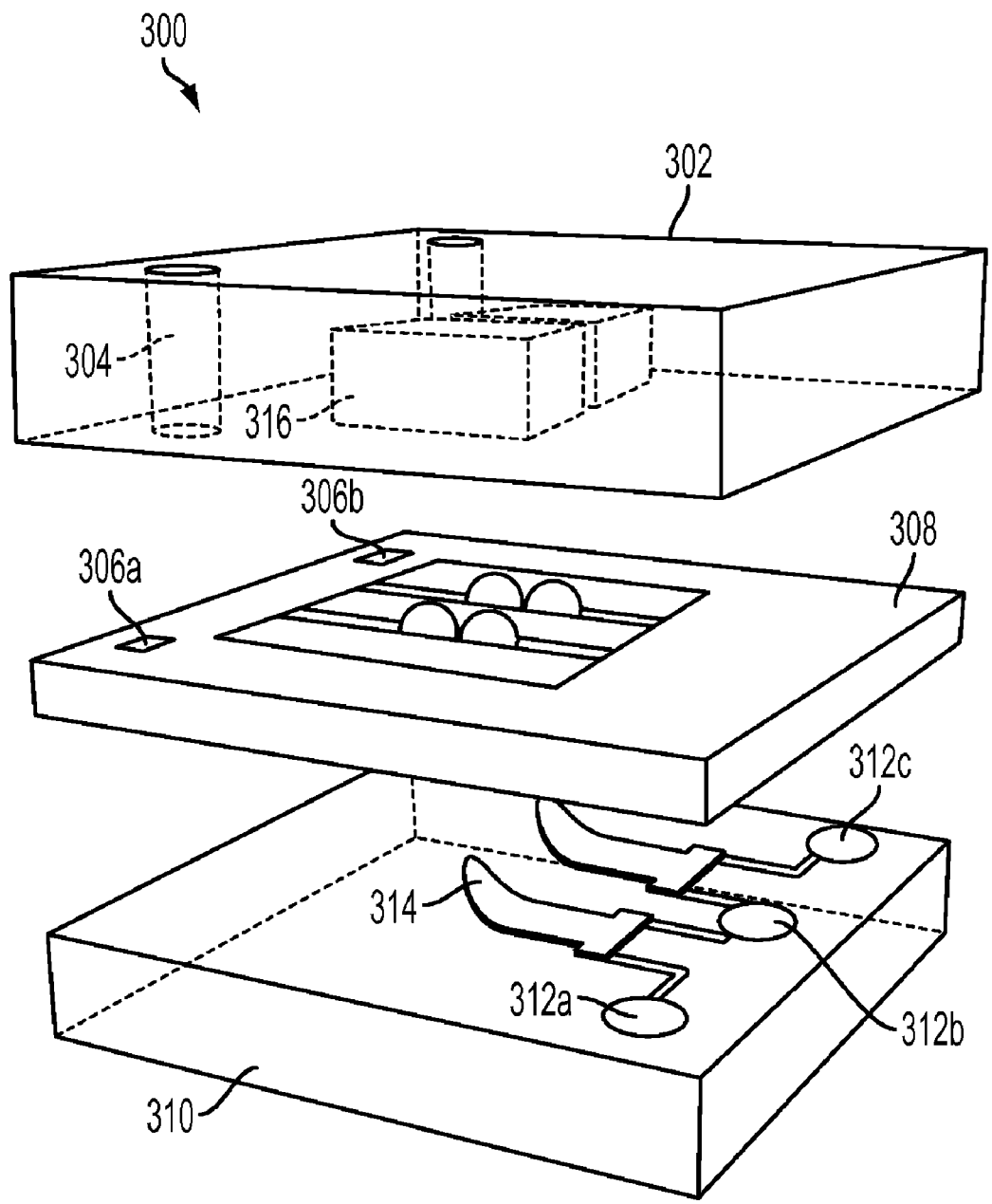
FIGS. 3A and 3B are illustrations expanding on the nanocalorimeter device of FIGS. 2A and 2B.
Figure 3B:
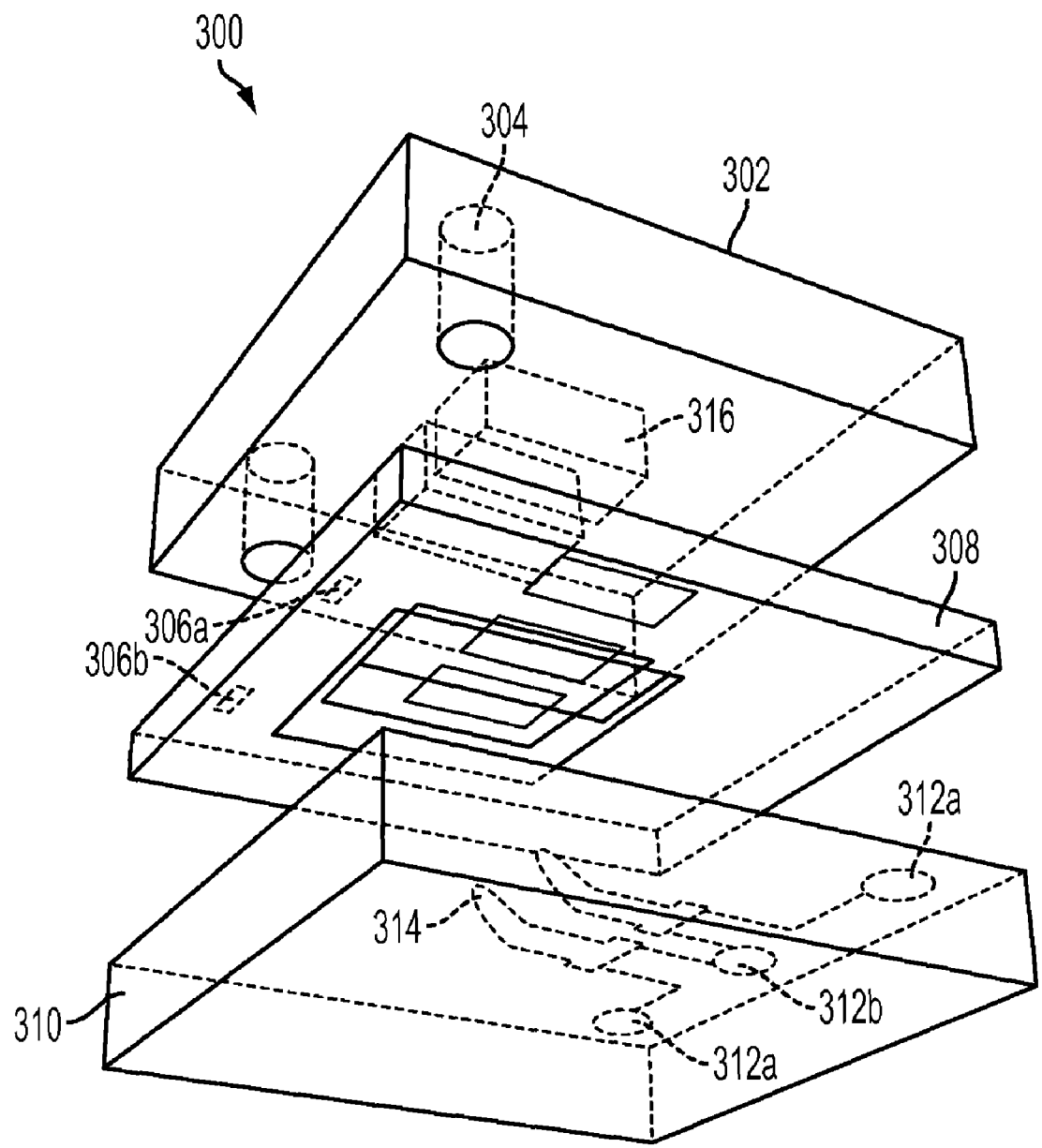

FIGS. 3A and 3B expand on the embodiment of FIGS. 2A and 2B. As shown in these figures a nanocalorimeter device 300 of the present application consists of the following three main parts.

A top 'cap layer' 302, which is similar to the one currently in use in previously described nanocalorimeters. The purpose of top cap layer 302 is to provide evaporation control. Feed-through holes 304 expose drop merger contact pads 306a, 306b on the upper surface of drop merging layer 308. It is noted no feed-through (vias) holes are located in measurement layer 310 for contacting probe contact pads 312a-312c of temperature probe 314. In another embodiment, connections to drop merger contact pads 306a, 306b are routed to the edge of drop merging layer 308 (similar to as shown in FIGS. 2A, 2B), eliminating the need for the feed-through holes. The routing can connect the merging areas in an entire row to minimize the complexity in merging drops across a row of sites.

The sample drops are manipulated (deposited, merged and mixed) on drop merging layer 308. After drop deposition, the top cap layer 302 is lowered onto drop merging layer 308 for evaporation control. In some embodiments a gasket or alternatively, grease, is to be applied to ensure proper sealing of the miniature chambers of the cap in which the drops are contained. An optional 'wall' 316 in the top cap layer may be incorporated to limit evaporative cross-talk between a sample measurement side and a reference side of the nanocalorimeter. The drop merger and mixer operations can be of the electrostatic type (as shown in the figures) but alternative, improved mergers or mixers are envisaged as well.

Thus, FIGS. 3A and 3B show the distinct separate nature of the three described layers/sections of nanocalorimeter device 300. By this construction measurement layer 310 is reusable and may be considered part of the measurement system.

The surface of the cantilevers of temperature probes can be coated (after release) with a thin layer of for instance parylene in order to passivate the cantilevers. Since the cantilevers will not be in contact with the drops which are being merged, in principle no cleaning steps are required in between measurements. Also, a ground shield can be fabricated around the cantilever, isolating the signal from noise due to voltage applied to merge drops and eliminating the need for a thin gold grounding layer on the bottom of the merging array. If desired, the shield can make ohmic contact with the copper (or other conductor) of the thermal equilibration areas for grounding of the areas. Since the probe is underneath the array, it will not be in the high humidity vapor around the drops, so adverse effects of humidity on the electrical behavior of the probe will not be an issue.

The cantilever temperature probes, self-heated by the electrical current flowing through them, may in some embodiments be arranged in Wheatstone half-bridge or Wheatstone full-bridge (in the latter case, two pairs of temperature sensors are needed). A thermal equilibrium is established just before drop merging (as is done in existing systems). To ensure that the cantilevers do not short out the heat generated by a reaction after drop merging, the following approximate calculations are made:

Using estimated values of $\kappa$ (thermal conductivity) of 1 W/(m.K) for $VO_x$ and cantilever beam dimensions of 1 mm length, 10 um width and 3 um thickness the thermal resistance between the tip and the anchor points of the cantilever can be calculated to be about 1.7E7 K/W. Furthermore, since the cantilever's mass is very small compared to the mass of the drop, the heat capacity of the cantilever can be neglected.

The effect on thermal dissipation time: (1.7e7 K/W)*(mass of drop*heat capacity of drop)=1.75e7K/W*(5e-4 g*4.184 J/g/K)=4e$^{-4}$4 sec, i.e. the tips will not decrease the thermal dissipation time below the current value of about 2.4 sec. This large time constant allows a lot of margin in the design and selection of materials: for instance $\kappa$ values could be larger (values of metals are typically on the order of 100's of W/(mK)), and beam thicknesses could be increased.

In existing nanocalorimeter devices metal traces are present connecting drop merge electrodes to the pads on top of the rigid substrate; the latter are about 800 um long, 50 um wide and 300 nm thick, and are made of Al (K of 237 W/(m.K)), resulting in a thermal resistance between merge area and substrate of 2.3E5 K/W. These traces in the existing integrated nanocalorimeter devices are not creating thermal shorting problems, and as their thermal resistance to the substrate is lower than the value for the envisaged $VO_x$ probes is a second, strong indication that the latter won't cause such issues either.

Thus, a concept disclosed herein is to separate the thermal sensing portion from the drop manipulation portion of the nanocalorimeter device, which allows better manufacturability and reduced manufacturing cost of the nanocalorimeter device. This design also makes it easier to explore, develop and integrate novel improved drop mergers and mixers, and provides good scalability.

Figure 4:
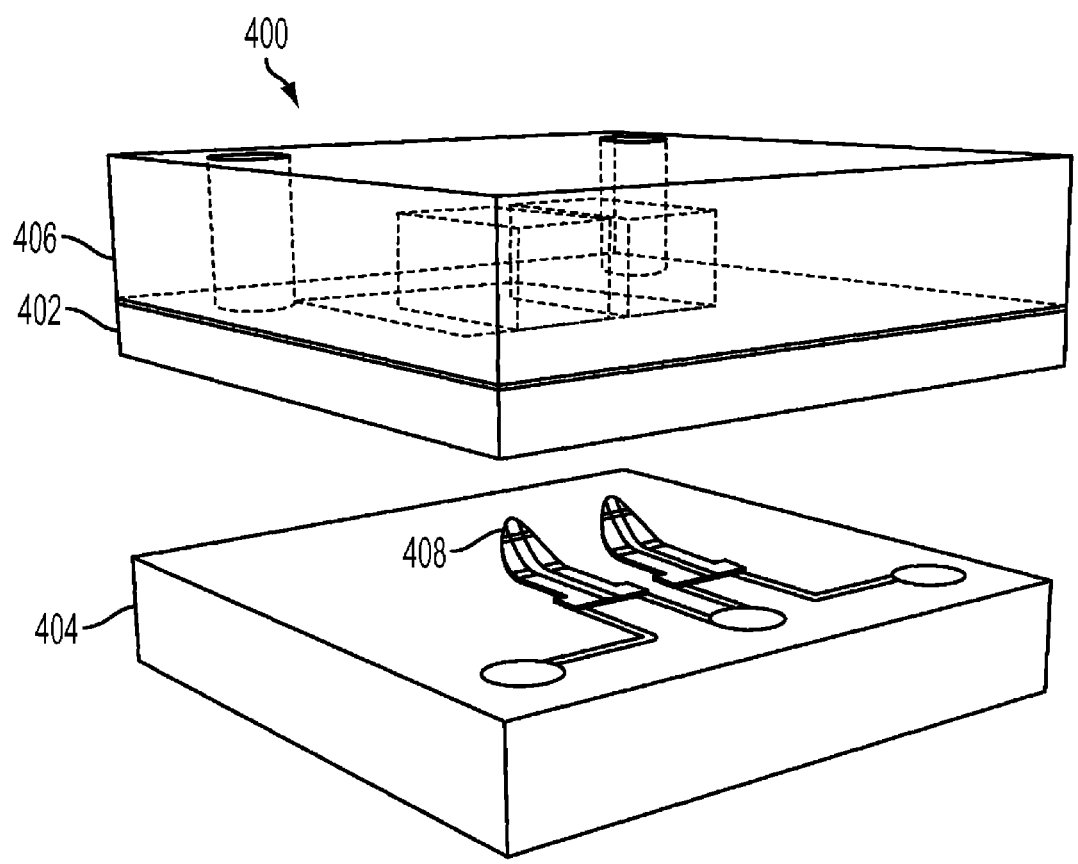
FIG. 4 illustrates the nanocalorimeter device of FIGS. 2A-2B and 3A-3B emphasizing the non-integrated aspect of the device.

Turning now to FIG. 4 illustrated is a depiction of a non-integrated nanocalorimeter 400 having separate components, consisting of a 'consumable' part (the drop merging layer) 402 and a 'reusable' part (the measurement layer containing the microprobes) 404, along with a reusable top cap layer 406. The cost of manufacturing of a fully integrated nanocalorimeter array would be expected to be higher than the cost of manufacturing of a merging array that only does drop manipulation. For instance, to build an integrated nanocalorimeter, a large number of thin film depositions and process steps are required (e.g., plated copper for thermal equilibration areas, vanadium oxide, two metal thin film depositions on the top, a third on the back for electrical grounding, two barrier layers of PECVD SiON to encapsulate the vanadium oxide, parylene, dip coating to create a hydrophobic surface). Also, critical alignment is required for the thermistor/metal interface in an integrated nanocalorimeter. On the other hand, the 'consumable' drop merging layer 402 of the nanocalorimeter 400 of FIG. 4 requires only two metals (i.e., for the copper thermal equilibration areas and drop merging areas), one dielectric layer for passivation (which can be parylene) and a hydrophobic surface coating, without critical alignment; also, wet etching of the metals can be performed instead of the more challenging lift-off process on current nanocalorimeter devices. Since the measurement layer 404 containing the cantilever temperature probes 408 is reusable (in theory an unlimited number of times; practically, until the probes wear out), it can be considered part of the measurement unit, rather than a consumable, and its manufacturing cost is less of an issue.

The fact of having a layer solely dedicated to drop manipulation also allows easier development and integration of novel drop mergers and mixers; as mixing speed is an important issue, this can be a very significant advantage. For example If it was useful to produce merging arrays with reagent already on the sites, perhaps as dry reagent that dissolves in a drop when the drop is placed on the site, or alternatively a surface-bound reagent such as an immobilized antibody or enzyme, then the non-integrated nanocalorimeters described herein enables production of such arrays.

Figure 10:
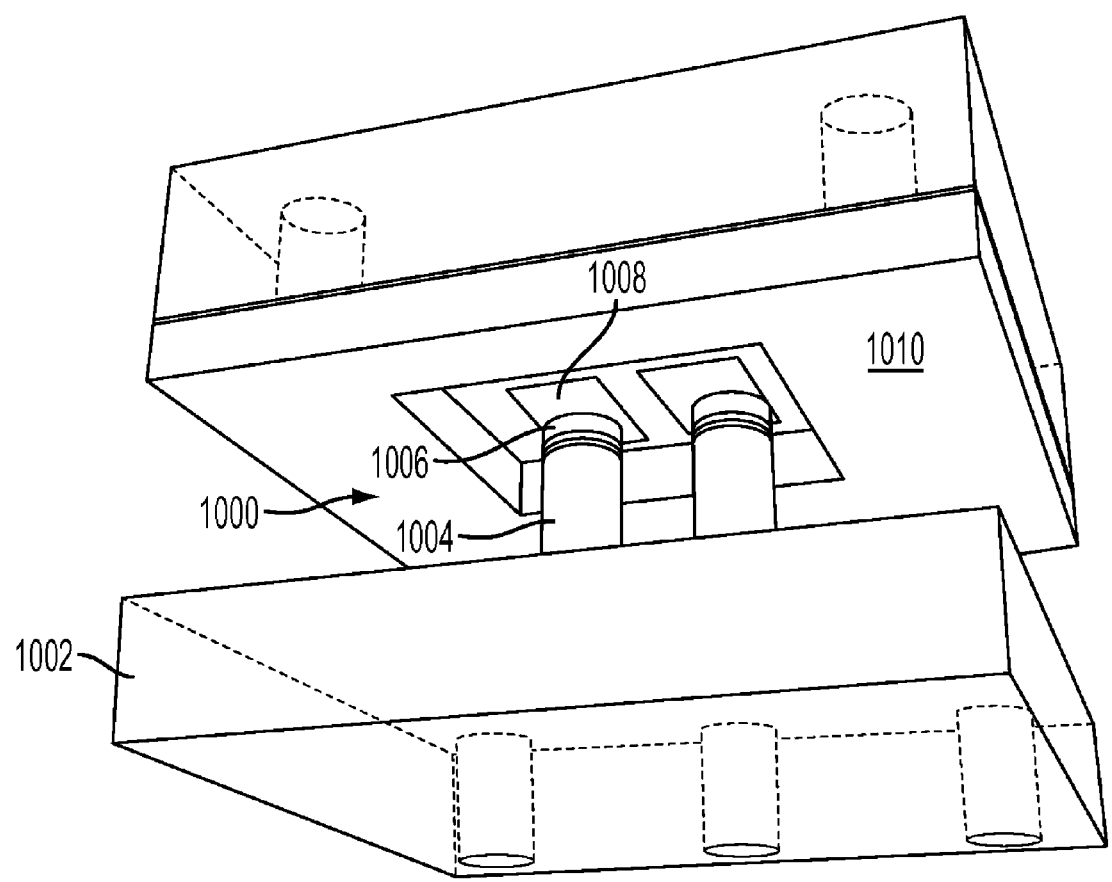
FIG. 10 illustrates an alternative embodiment of a nanocalorimeter featuring posts perpendicular to the array surface.
Figure 11:
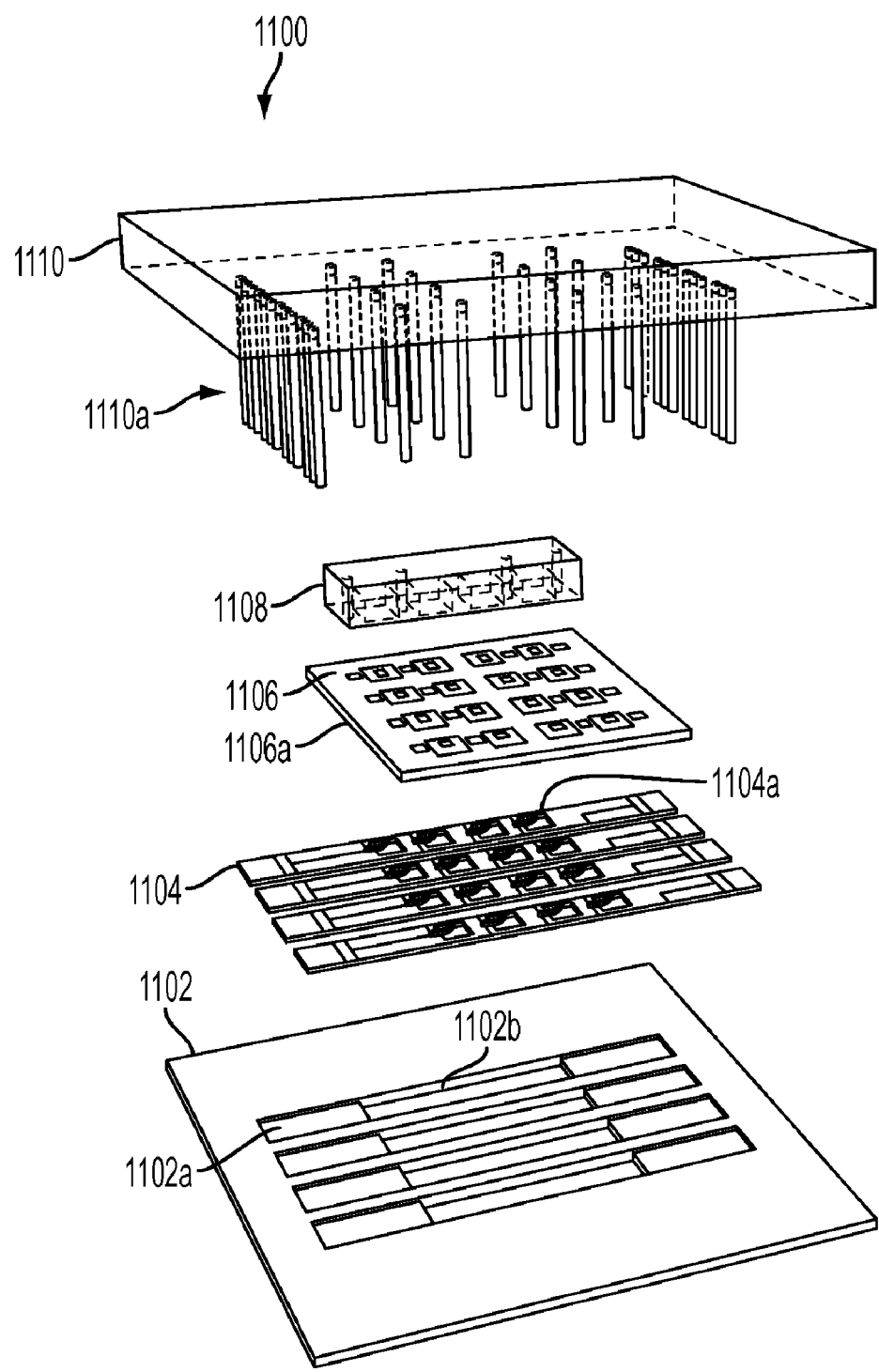
FIGS. 11-13 illustrates another embodiment of a nanocalorimeter.

Further, since the substrate of measurement layer 404 is, at least in one embodiment, a PCB-type material with surface contacts (and in other embodiments a PCB-type material with via holes, as shown in FIGS. 10 and 11), contacting sensors and routing signal lines can be in some cases more reliable than the current practice (pogo-pins). Measurement layer 404 on which the temperature probes 408 are built will in one embodiment have a large thermal mass in order to dampen out thermal oscillations. The need to dampen out thermal oscillations will guide the design of the bottom piece and the selection of substrate materials.

In one embodiment cantilever fabrication is enabled by StressedMetal® technology invented and developed at Palo Alto Research Center (PARC) in Palo Alto, Calif. Stressed-Metal® is a registered trademark of PARC.

Figure 5:
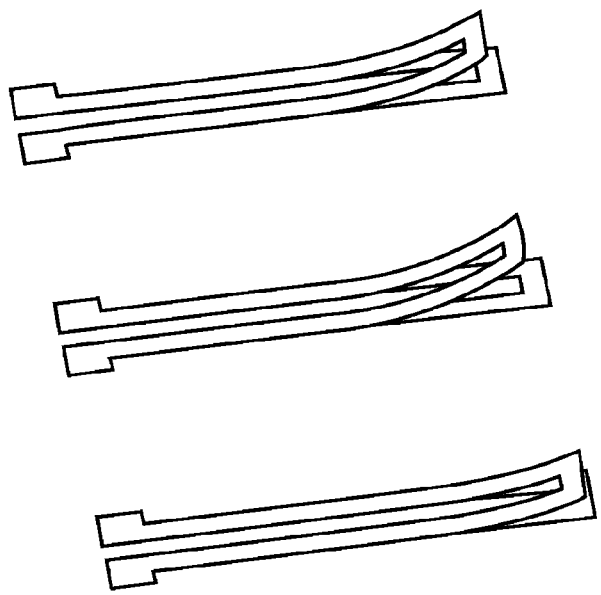
FIG. 5 is a view of one type of cantilever that could be used in a system of cantilever temperature (or thermistor) probes.
Figure 6A:
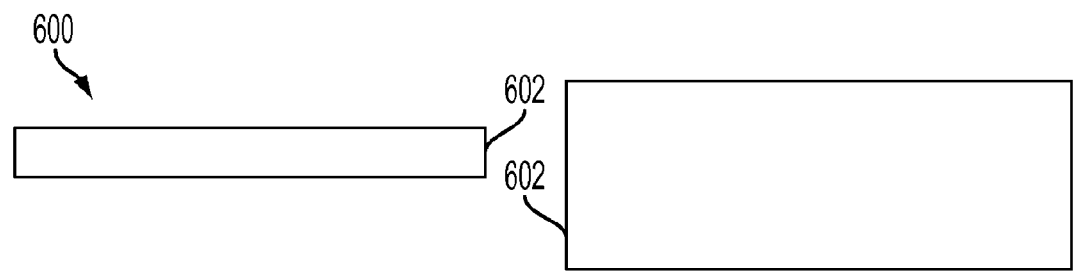
FIGS. 6A-6J depicts a process flow for manufacturing a cantilever thermistor probe.
Figure 6B:
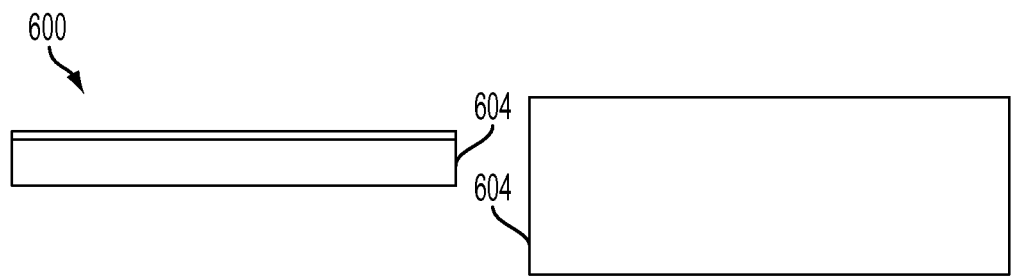
Figure 6C:
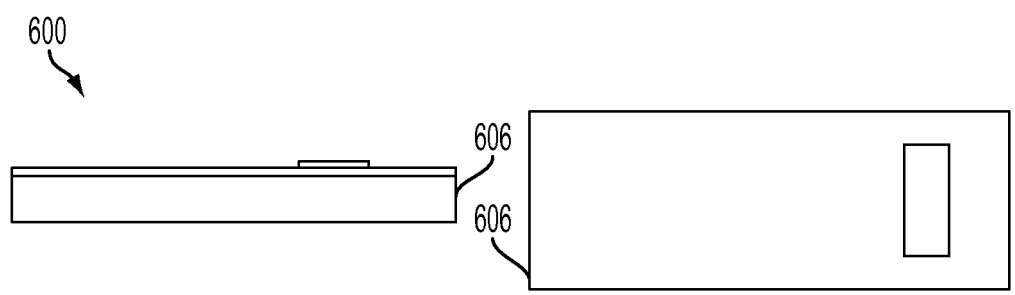
Figure 6D:
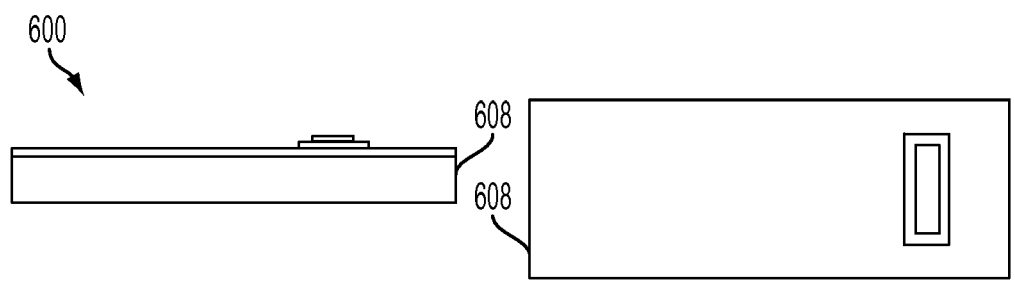
Figure 6E:
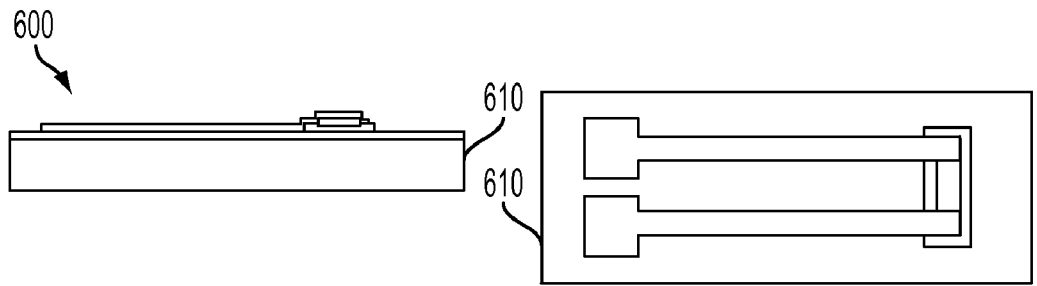
Figure 6F:
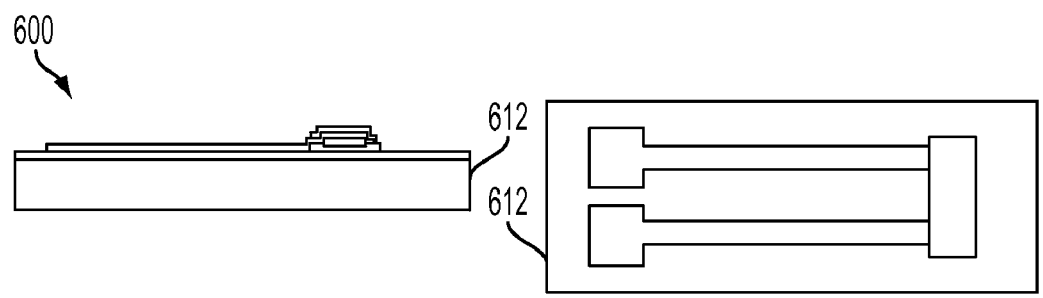
Figure 6G:
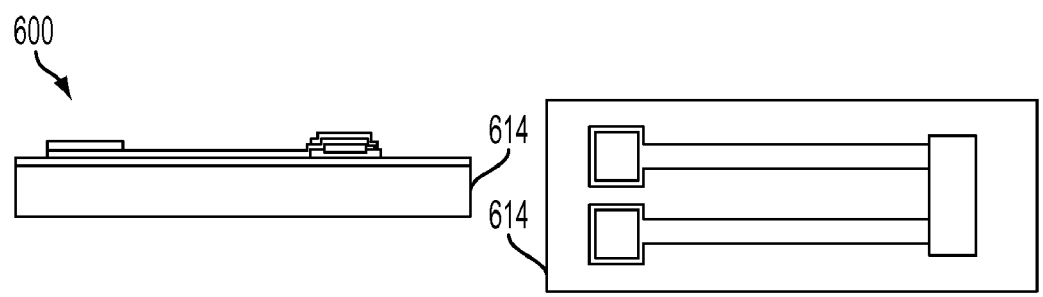
Figure 6H:
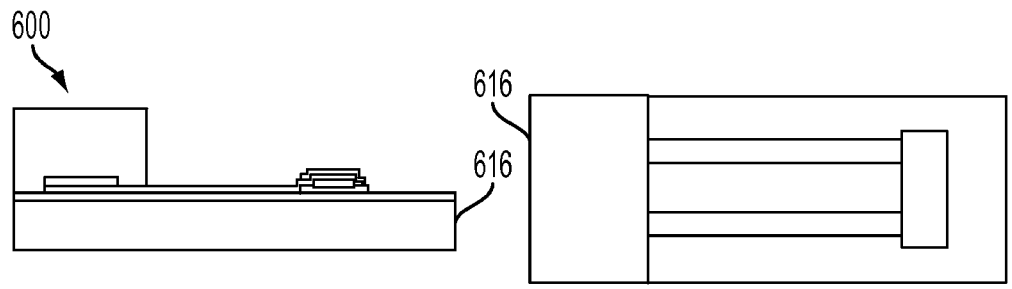
Figure 6I:
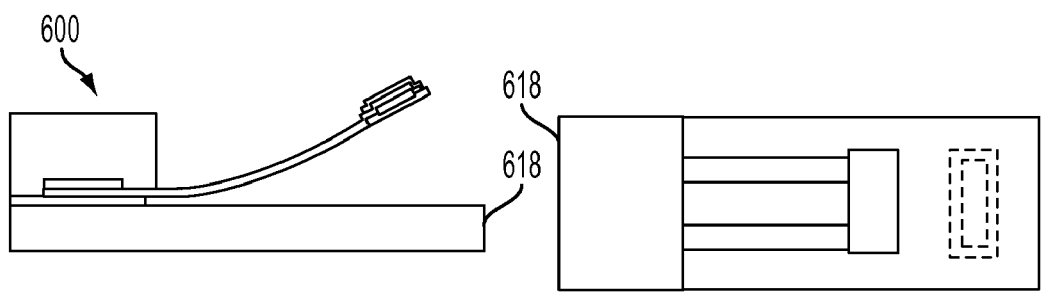
Figure 6J:
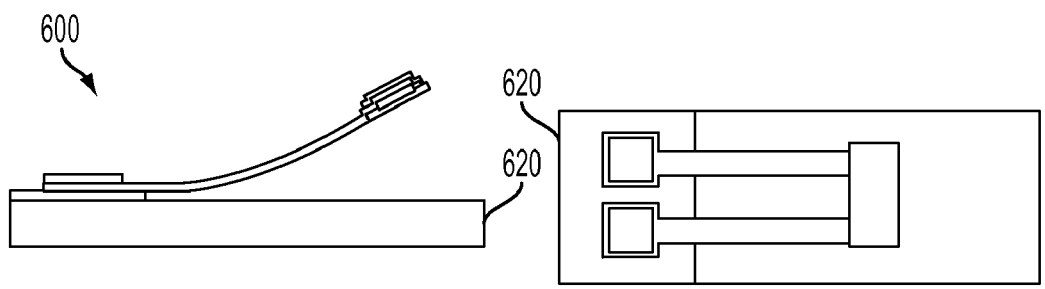

StressedMetal® technology is based on micro-fabrication techniques that take advantage of the stress that occurs in the thin film deposition process. In thin film deposition, extremely thin layers of metal film are deposited onto a substrate, such as silicon or glass. To create StressedMetal® micro-structures, films are sputter deposited with an engineered built-in stress gradient, on top of a sacrificial layer. After lithographic patterning, the sacrificial layer is etched away and the micro-structures are released. The metal's inherent stress causes it to lift or curl into a designed radius of curvature, creating 3D structures such as tiny coils, springs, or cantilevers. An example of two-legged cantilevers formed by this process is shown in FIG. 5.

As previously mentioned in some embodiments the cantilever probes (or sensors) used in the nanocalorimeters depicted in FIGS. 2A-4 are made using a fabrication process that combines these techniques with the high quality, low-noise vanadium oxide thermistor material. The process is also used to fabricate and test higher sensitivity p+ amorphous silicon thermistors, as well as higher temperature processes for vanadium oxide that have an improved sensitivity. Preliminary data on p+ amorphous silicon shows a temperature coefficient of resistance as high as 4%/K for this material, compared with 2.8%/K for our current vanadium oxide thermistors. Literature on vanadium oxide suggests values as high as 5.2%/K are feasible with modified deposition.

FIGS. 6A-6J show a schematic outline 600 of a process to form a hybrid temperature probe having a thermal sensor carried on a cantilever. As will be expanded upon, a hybrid temperature probe is one comprised of different materials for different portions or sections of the probe.

Initially, a silicon substrate is provided (step 602), then a sacrificial layer of titanium is deposited onto the silicon substrate (step 604). Next a dielectric layer is deposited and patterned, which will serve to electrically passivate the thermistor material (step 606). In this embodiment, a thermistor material (e.g., vanadium oxide ($VO_x$) or p+ amorphous silicon (p+ a-Si)) is deposited (step 608). Following this step, a stressed metal (e.g., an alloy of molybdenum and chromium, denoted as MoCr or an alloy of nickel and zirconium denoted as NiZr) is deposited and patterned to form a two-leg component (step 610). The stressed metal contacts the vanadium oxide, which forms a bridge between the two legs. In step 612 a top passivation dielectric is deposited, and in step 614 a thin gold layer is deposited to provide a good electrical contact to the sensor. In steps 616, 618 and 620 the sacrificial titanium layer is selectively etched away, resulting in the release of the cantilever structure, which in this case is a hybrid cantilever thermistor probe, with one end attached to the substrate and a free end extending out of the substrate and carrying the thermistor tip. The above process may optionally incorporate a load layer.

Electrically, the thermistor carried on a cantilever formed by the process of FIGS. 6A-6J is a resistor, where current flows in through one leg of the cantilever structure and flows out of the other leg. Since the current passes through the vanadium oxide at the tip of the component, it will be highly sensitive to temperature changes at the tip (see FIG. 4).

Figure 7:
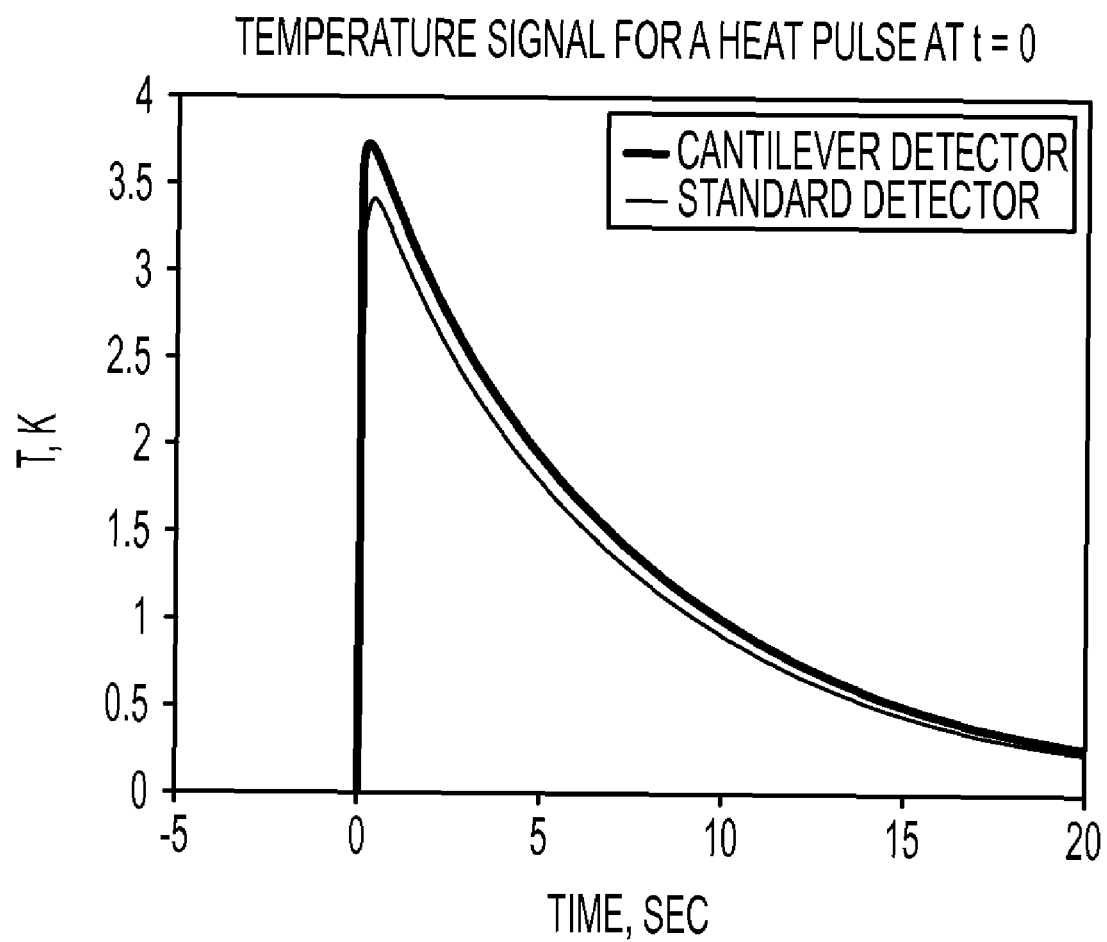
FIG. 7 is a graph comparing temperature signals for an integrated nanocalorimeter and a non-integrated nanocalorimeter.

FIG. 7 shows the simulated temperature signal for a pulse of heat generated in a drop at time t=0, for both a nanocalorimeter device with integrated thermal sensors and a non-integrated nanocalorimeter device (i.e., with cantilever-based thermal sensors). The thermal equilibration areas for a cantilever-based device, are smaller in an areal extent than the device with integrated thermal sensors by the amount of the area of the thermal sensors for the latter case. As seen in FIG. 7, the signal for the cantilever design is slightly larger, so there is no loss in signal strength and in fact a predicted 9.4% increase. Since the cantilever is thin, very little heat conducts along it relative to heat conduction in the air, keeping it from being a "short circuit" of the heat generated in the drop. In summary, these finite element simulations support the move to cantilever temperature probes.

Turning now to FIGS. 8A-8E, another process 800 to form a cantilever structure is set forth. In this embodiment stress-engineered sputter-deposited monolithic vanadium oxide cantilever probes are formed (such as shown in FIG. 5), which can be used as temperature sensing components. As will be expanded upon, a monolithic temperature probe is one comprised of a single material for portions or sections of the probe.

This cantilever probe has two connected legs and two anchor points which consist entirely of sputtered vanadium oxide, and which at the same time forms the curved cantilever structure and defines an electrical resistor used as temperature sensor (thermistor). The combination of the high temperature coefficient of resistance and low 1/f noise of vanadium oxide results in superior thermal sensing specifications.

Figure 8A:
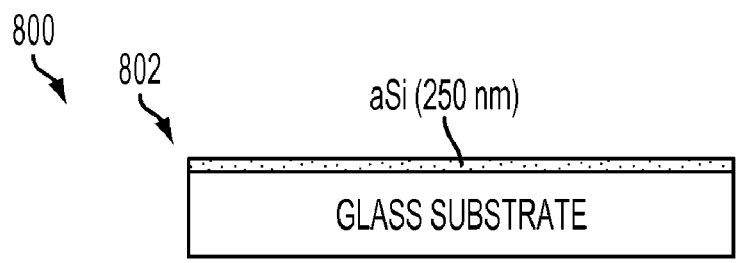
FIGS. 8A-8E depicts a process flow for manufacturing a cantilever thermistor probe, as seen in FIG. 5.
Figure 8B:
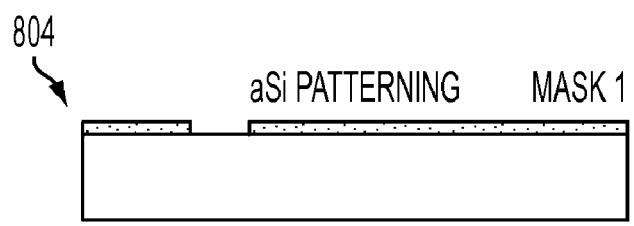
Figure 8C:
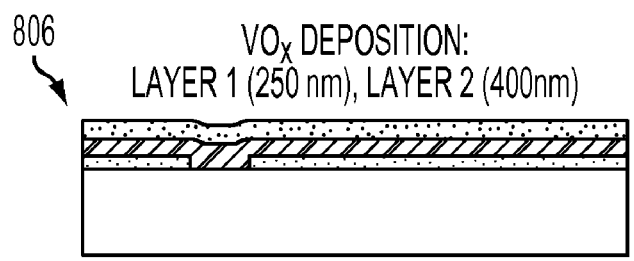
Figure 8D:
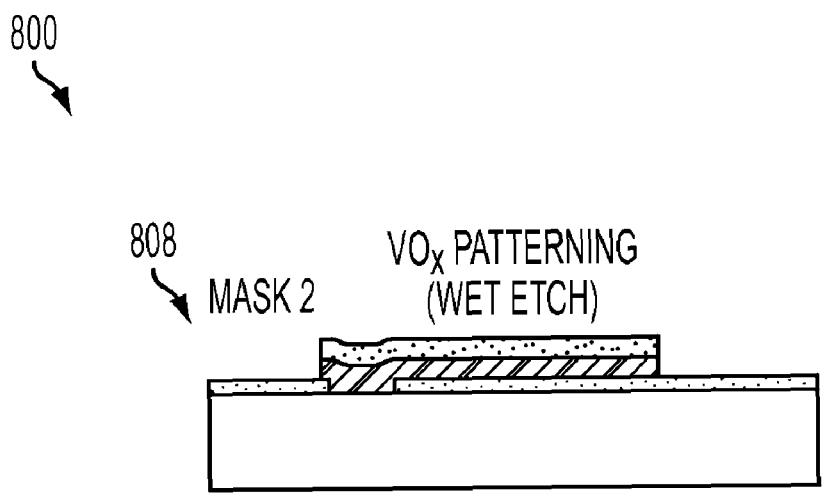
Figure 8E:
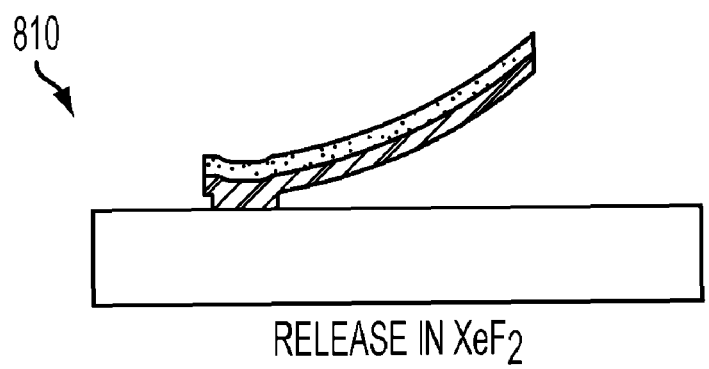

With continuing attention to FIGS. 8A-8B, in a step 802 a thin film of amorphous silicon is deposited on a substrate as a sacrificial layer. In step 804 the amorphous silicon is patterned and then in step 806 a first layer of the vanadium oxide and a second layer of the vanadium oxide are deposited in a low temperature DC-sputtering process. After the deposition of the vanadium oxide layers, the layers are patterned, in one embodiment by a wet etching process, in step 808. Thereafter, the amorphous silicon is etched in step 810 to release the cantilever structure consisting of two layers of vanadium oxide. In one embodiment a gaseous, xenon difluoride release etch process is used to release the components. The released structure is a monolithic temperature probe, which is at one end anchored to the substrate while a free end extends out of the substrate.

In process 800, two lithography steps are performed in the patterning operation in steps 804 and 808 to form the cantilever shape. The following sputtering conditions are employed:

For the first $VO_x$ layer: 600 W DC power, 10:1 $Ar:O_2$ ratio, 1.6 mTorr total pressure, 250 nm thickness (±25 min); and For the second $VO_x$ layer: 600 W DC power, 10:1 $Ar:O_2$ ratio, 7.6 mTorr total pressure, 400 nm thickness (±40 min)

It is noted the target material is 99.9% pure (metallic) vanadium.

These conditions result in cantilever lift heights of about 70 um for single cantilevers 300 um long and 30 um wide. Measured stress values were 245 MPa compressive stress in the first layer and 48 MPa tensile stress in the second layer. Of course it is to be appreciated the above values and measured results are one set of parameters obtained using certain sizes and amounts of materials. It is to be appreciated these parameters, sizes and amounts can be adjusted depending on the nanocalorimeter devices being designed, resulting in differing results and parameters. For example, while the above description notes the Argon (Ar) to Oxygen ($O_2$ ratio is 10 to 1, in other embodiments the amount of Argon may be in a range of 20 (e.g., 20:1) to 5 (e.g., 5:1) times more prevalent than the Oxygen. It is also noted the other above recited conditions will also operate in ranges other than the specific numbers which have been recited, such as the 600 W DC power, may range from 100 to 800 W DC for particular operations, and the pressure applied may range between 1 m Torr to 10 mTorr.

The sputtered vanadium oxide films show a behavior similar to the 'traditional' stressed metal materials such as MoCr or NiZr—the lower sputtering pressures result in denser layers with compressive stress, and higher pressure values lead to tensile stress in the film. A point of difference is the fact that in the case of the sputtered vanadium, the vanadium is also being oxidized in situ, due to the presence of oxygen in the chamber. It is be understood that while cantilever probes and thermistors made of vanadium have been discussed, such probes made of different materials may also be used, such as but not limited to probes made from MoCr or NiZr, among others.

Vanadium oxide has properties that make it an excellent candidate material for thermistors, these include a combination of relatively high temperature coefficient of resistance (TCR) and low resistivity, as well as low electrical 1/f noise.

The thermistor material (vanadium oxide) is also employed here as a structural material. It's unique compared to many other micromachined materials as its TCR is higher, for resistivities that are relatively low. At the same time, its 1/f noise is very low.

Dual beam structures such as formed by processes 600 and 800 (as well as variants on these processes) will be highly sensitive to the temperature measured along the beam. Due to the fact that the beam is lifted out of the plane and is very thin, the necessary thermal insulation from the substrate is provided.

Prototypes of the monolithic vanadium oxide beams formed by process 800 and measurements of the temperature coefficient of resistance (TCR) and the Noise Equivalent Temperature Difference (NETD) have been performed and are similar to the values measured on integrated nanocalorimeter vanadium oxide ($VO_x$) devices, the TCR is about 3%, and the NETD is about 10 to 30 uK (Kelvin).

In addition to the above-described concepts, variations to the current embodiments are possible. Among these are positioning the temperature (or thermometer, or thermal) probes to approach the array the drops from the top, and brought in close proximity with the merged drop to measure its temperature. The drop merging layer may incorporate a wide array of alternative drop mixing techniques besides the pure electrostatic merger. The cantilever thermistor (thermal) probes may consist of alternative thermistor materials, and/or can be manufactured using alternative processes. In still additional embodiments the cantilever thermistor (thermal) probes can consist of any stressed metal beams that are lifted out of the plane, with any type of miniature temperature sensing element attached or mounted to the tip. For instance, quartz crystal temperature sensing elements, thermopiles or pn-junction temperature sensors could be bonded to the tips.

Figure 9:
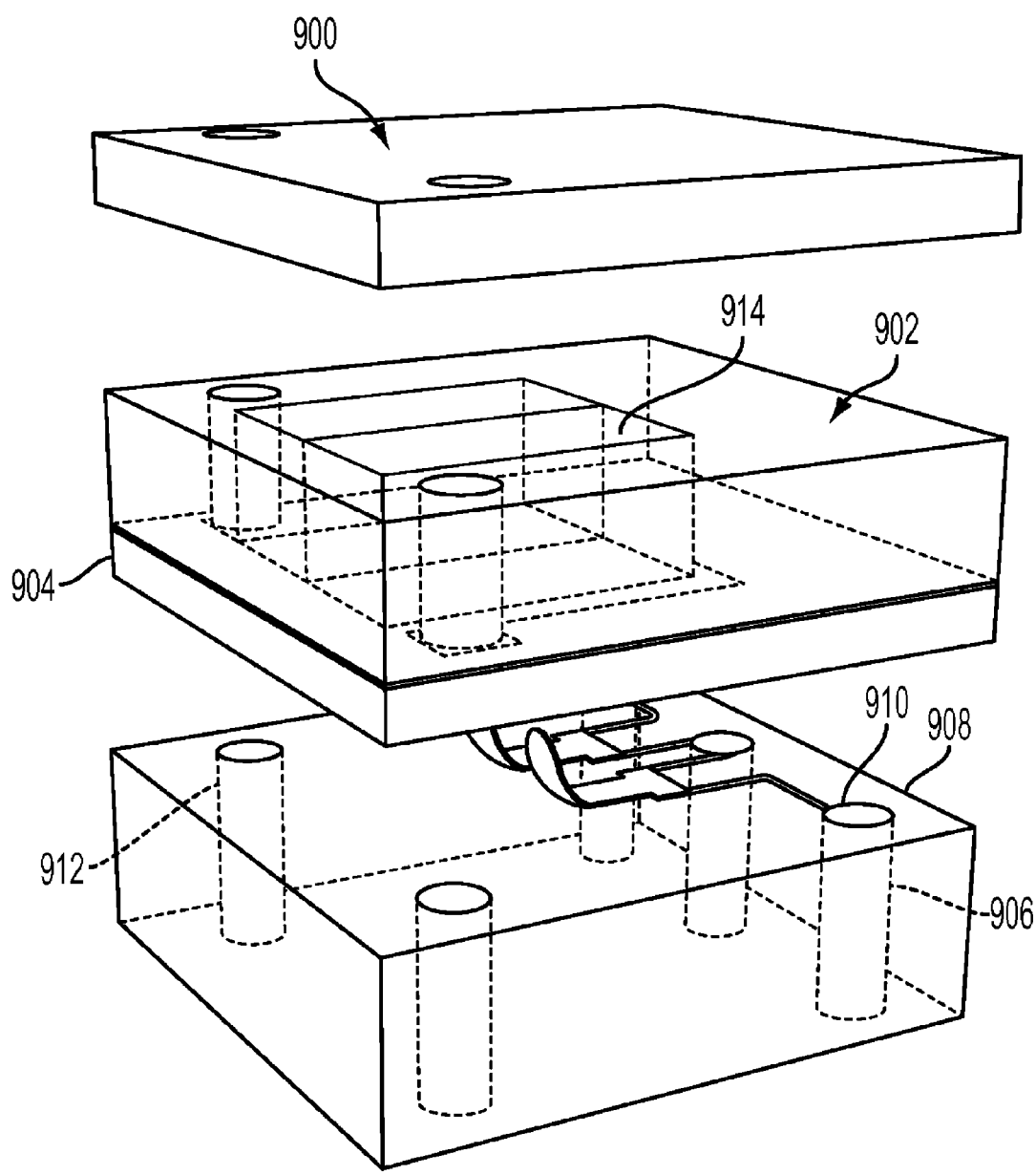
FIG. 9 illustrates an alternative embodiment of a nanocalorimeter featuring an evaporation control structure on an array.

In yet a further embodiment an alternative cap layer for evaporation control is shown in FIG. 9. Here a flat top cap layer 900 is brought in operative association with an intermediate cap layer 902, which is bonded onto drop merging layer 904 or is created on the drop merging layer using high aspect-ratio lithography (for instance of SU-8). As depicted intermediate cap layer 902 includes separation walls between drop merging areas of merging layer 904. This design may result in easier and/or better sealing of the drop merging areas.

Also shown in this embodiment is the use of via holes 906 in measurement layer 908, which provides electrical connection paths to the temperature probe contact pads 910. Additional via holes 912 though out the layers are arranged to provide alignment and spacing of and between the layers of the nanocalorimeter device. Intermediate cap layer 902 includes walls 914.

Turning to FIG. 10 depicted is a nanocalorimeter embodiment which, instead of using curved cantilevers as temperature sensors, employs an array of pillars 1000 perpendicular to measurement layer 1002. These pillars consist for instance of posts 1004 patterned out of SU-8 (a thermally insulating material) with thermal sensors 1006 deposited on top. Thermal sensors 1006 are then placed in operative contact with thermal equilibration areas 1008 of merging layer 1010. An advantage of this approach is that the pillar temperature probes are more robust mechanically (i.e., the pillars are non-compliant of stiff). To fabricate this nanocalorimeter embodiment, electrical contact lines need to be routed along the pillars to contact the thermal sensors of the temperature probes.

It is to be understood the embodiments of FIGS. 9 and 10 maybe designed without the via holes to provide electrical contacts to the temperature probes, but rather such connections maybe made by surface contact pads as described on other embodiments.

FIGS. 11-16 show an alternative embodiment and construction arrangement of a nanocalorimeter 1100 according to the present application. FIG. 11 is an exploded view of nanocalorimeter 1100, including a modified interposer 1102, having slots 1102a, within which are located openings 1102b; a measurement layer 1104 with an array of cantilever temperature probes 1104a; a drop merging layer 1106 on a stiffener 1106a; a top cap layer 1108; and a printed circuit board (PCB) 1110 with contact pogo or guide pins 1110a. It is noted that in FIG. 11, pogo pins 1110a serve to make electrical contacts. The design of measurement layer 1106 allows the pins contacting the sensors to be routed to the edge of the layer. This figure shows contact pins to the mergers as well, and these are not routed to the edge, although that would be possible as well, when rows are tied together.

Figure 12:
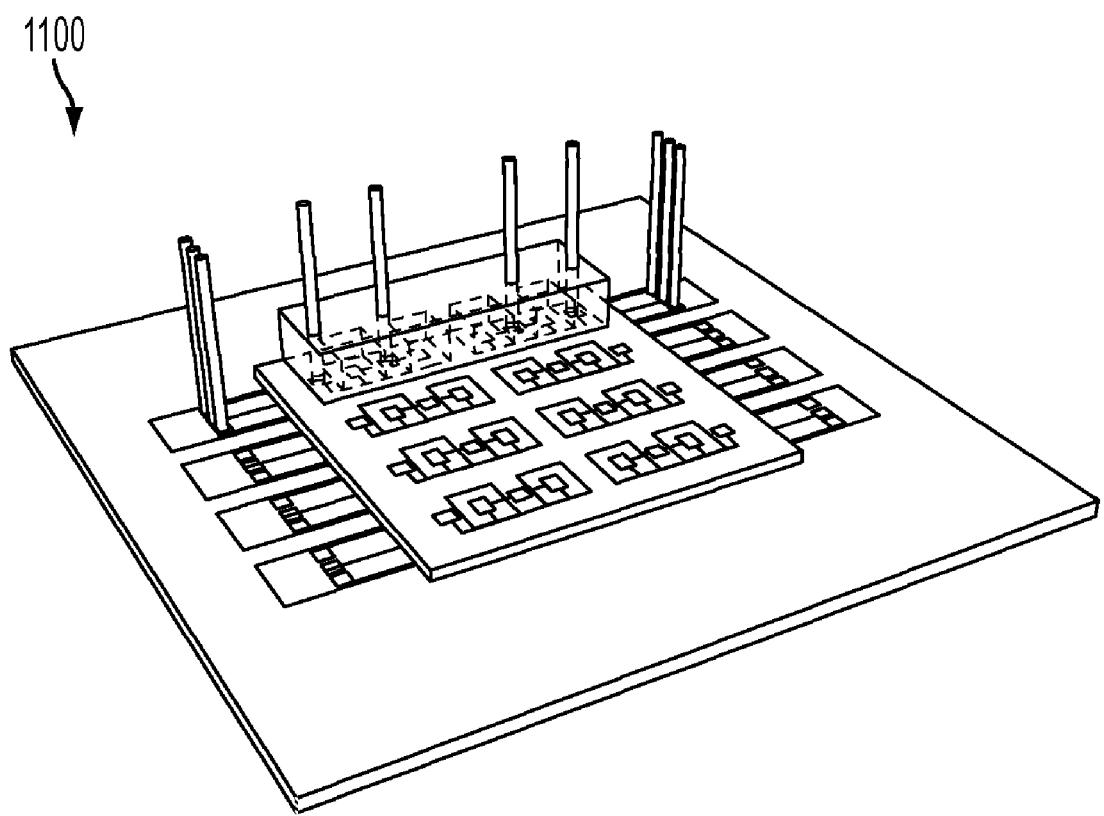
Figure 13:
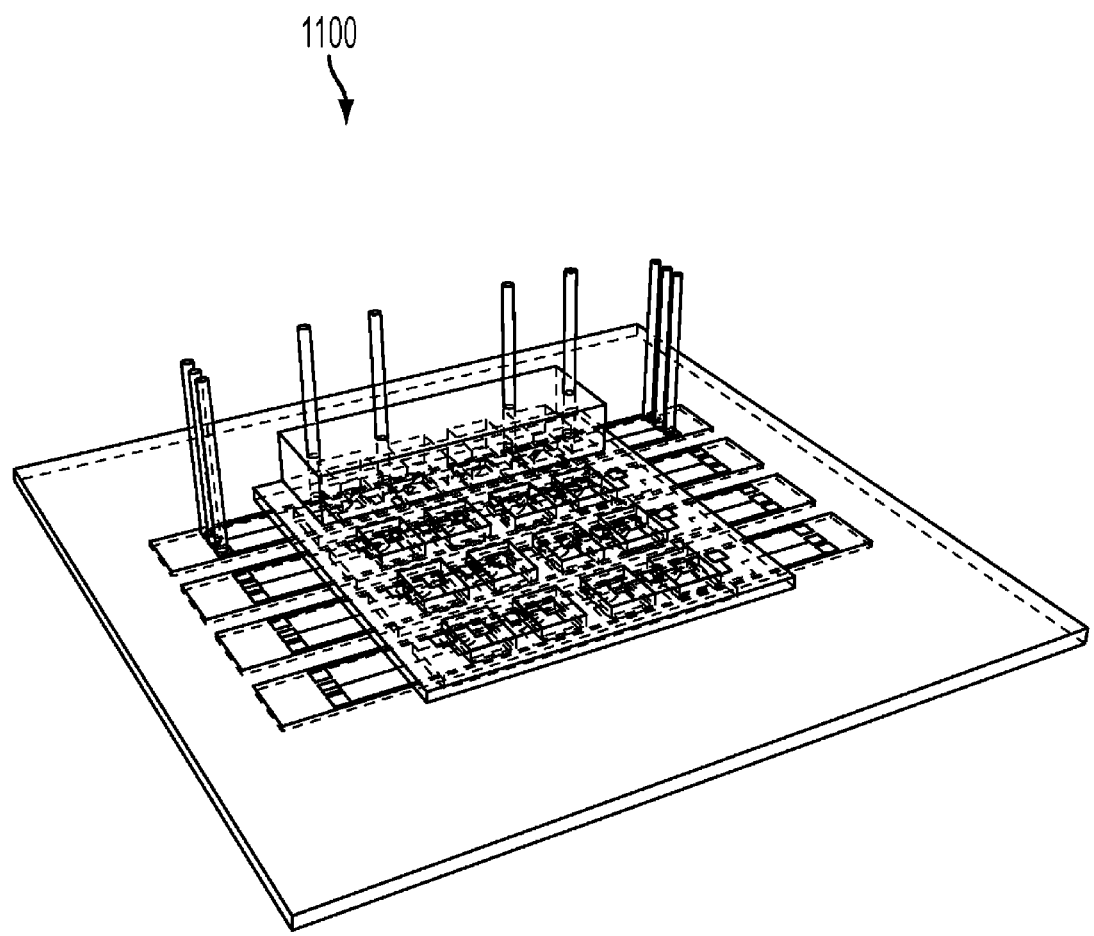

FIGS. 12 and 13 show the components of FIG. 11 in operative association. For example, as depicted in FIGS. 12 and 13, the measurement layer 1104 is located within the modified interposer 1102. It is noted that the modified imposer is substantially a carrier which holds components of the device as they are assembled, such as for instance by a robotic manufacturing arrangement. Then, drop merging layer 1106 is aligned and brought in operative association with the measurement layer 1104, by use of pogo or guide pins 1110a of PCB 1110.

Figure 14:
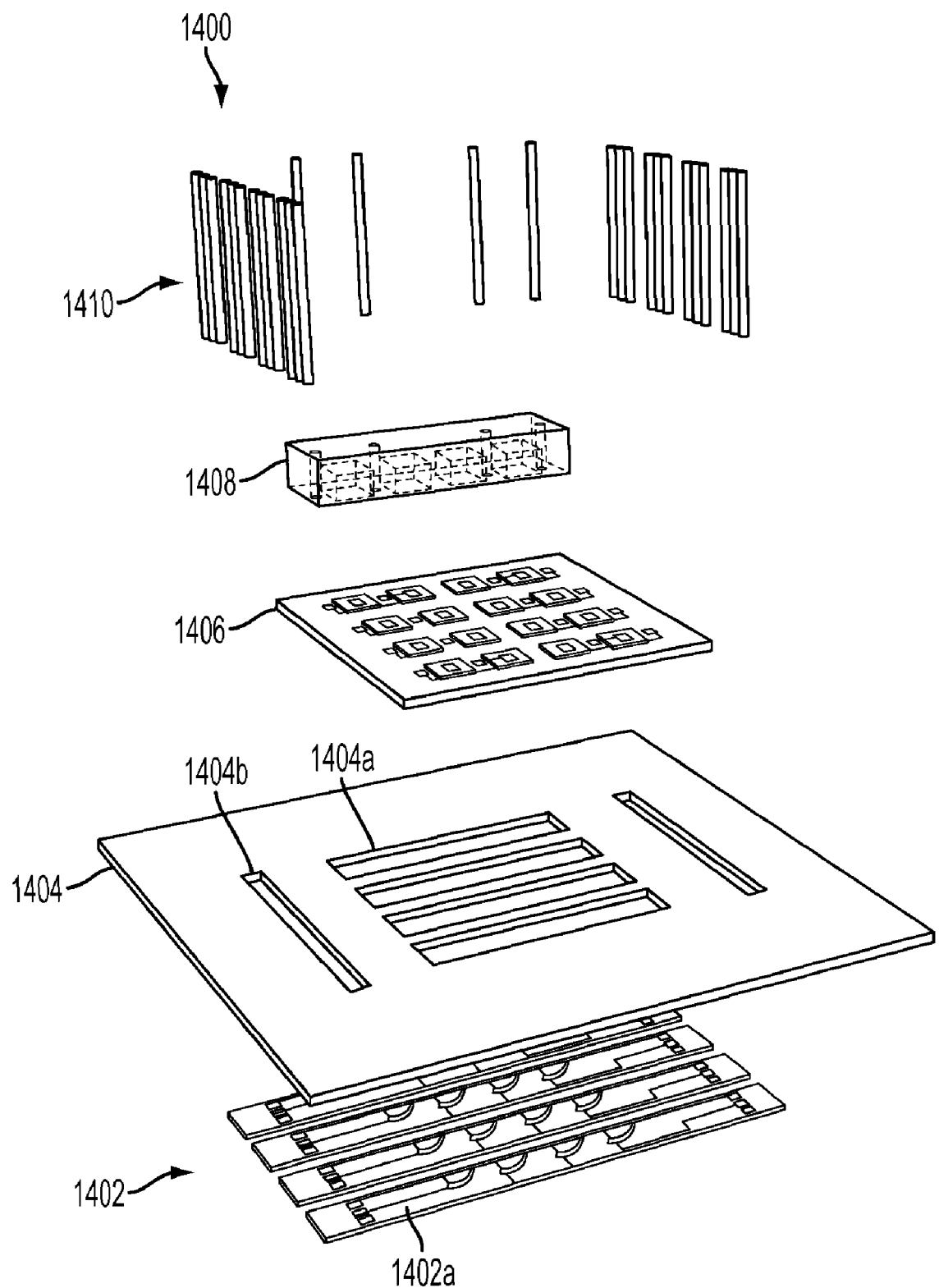
FIGS. 14-16 illustrates another embodiment of a nanocalorimeter.
Figure 15:
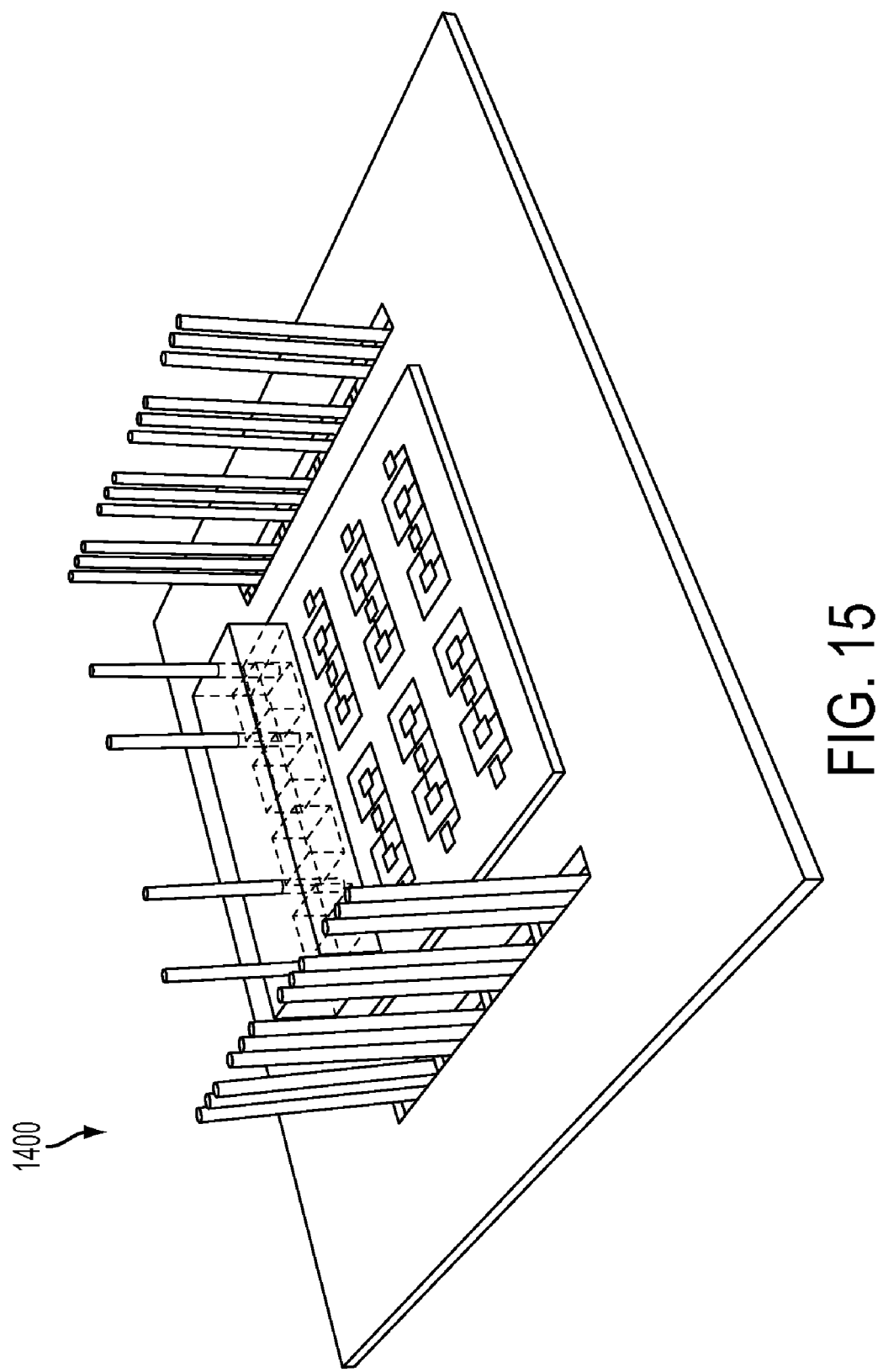
Figure 16:
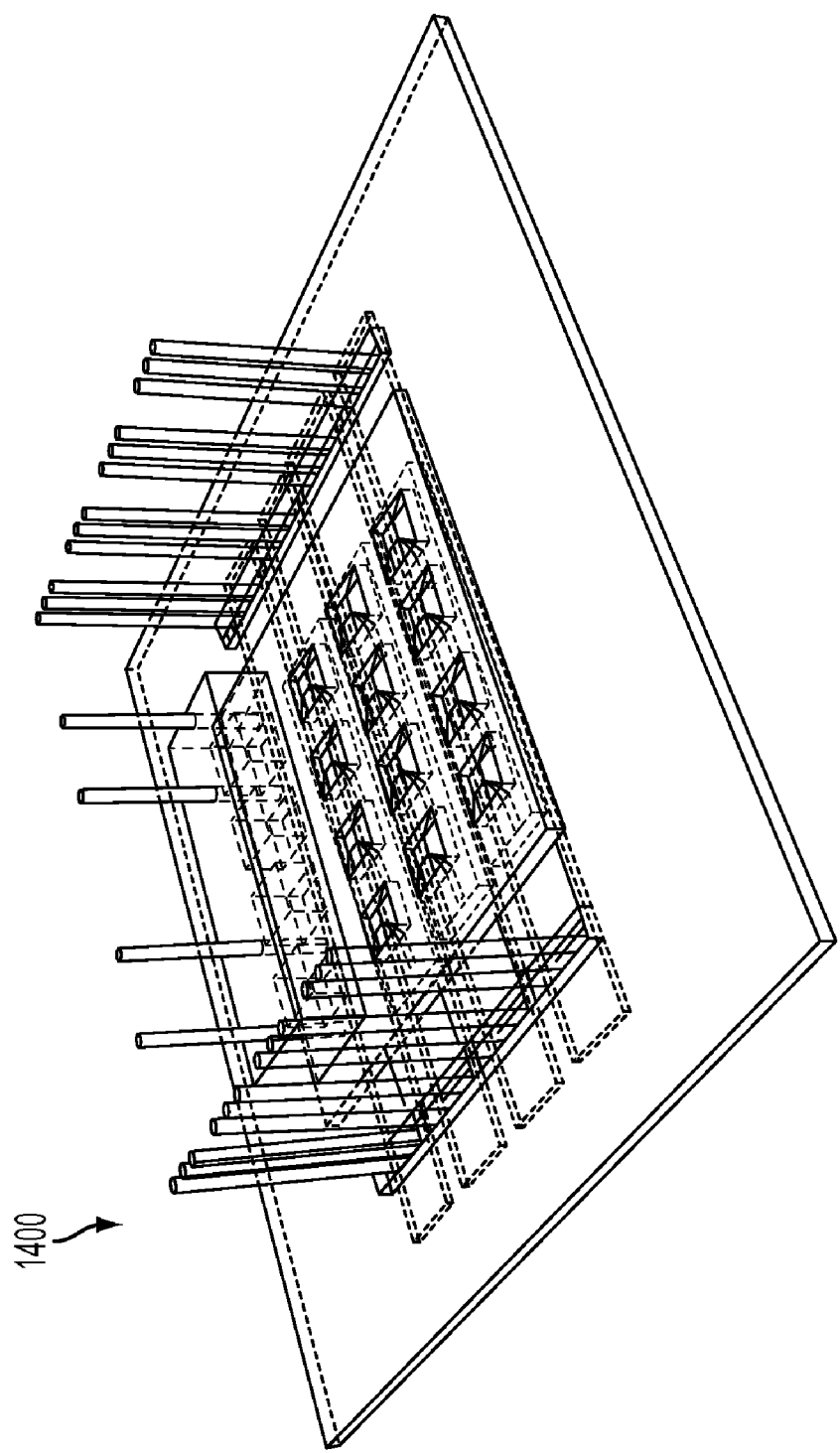

FIGS. 14-16 illustrate a further embodiment of a nanocalorimeter 1400 in accordance with the present application. FIG. 14 depicts an exploded view of the nanocalorimeter including, a measurement layer 1402, having an array of cantilever temperature probes 1402a; a modified interposer 1404 with openings 1404a which allow the temperature probes to pass there through, and slots 1404b; a drop merging layer 1406; a cap 1408 and pogo (or guide) pins 1410. FIGS. 15 and 16 illustrate two views of the components of FIG. 14 brought into operative association with each other. In particular, the measurement layer 1402 is located below the interposer 1404 and aligned to allow the cantilever temperature probes to extend through openings 1404a and to allow pogo or guide pins 1410 to pass through slots 1404b to openings on measurement layer 1402. The other layers of the nanocalorimeter (e.g., drop merging layer 1406 and cap layer 1408) are also aligned to have the pogo or guide pins pass there through. It is noted that in the embodiment of FIGS. 14-16, the cantilever temperature probe will have lift height greater than the lift height of the probes of FIGS. 11-13. The lift heights of the cantilevers is controlled by the fabrication techniques used in forming the cantilevers.

FIGS. 11-16 further illustrate the non-integrated nature of the nanocalorimeters of the present application, as they emphasize the operative association between the layers, such as between the drop merging layer and the measurement layer. In other words there is no permanent attachment between the measurement and drop merging layers. Therefore, following proper alignment and spacing between the layers, merging operations and temperature measurements can be undertaken. Thereafter, following completion of such operations, the initial merging layer can be easily taken out of operative association with the measurement layer. Then a second merging layer can be placed into operative association with the same measurement layer.

Operative association is used herein to mean that the various layers are positioned so as to make the nanocalorimeter operative. For example, the top cap and the merging layer are in operative association even if there is a layer of grease or a gasket located between these layers. A similar situation may also exist between the drop merging layer and the measurement layer.

It is mentioned here that the probes (or microprobes) as described herein should be generally understood as temperature (thermometer, thermal, etc.) probes, as opposed to bimorph components where the cantilever deflection is used as a measure for temperature change.

It will be appreciated that various ones of the above-disclosed and other features and functions, or alternatives thereof, may be desirably combined into many other different systems or applications. Also that various presently unforeseen or unanticipated alternatives, modifications, variations or improvements therein may be subsequently made by those skilled in the art which are also intended to be encompassed by the following claims.

What is claimed is:

1. A nanocalorimeter comprising:
    a drop merging layer including, a drop placement area for holding drops to be merged and a thermal equilibration area; and
    a measurement layer including, a substrate, and a temperature probe formed on the substrate, wherein the temperature probe extends out of the surface of the substrate into operative contact with the thermal equilibration area of the drop merging layer when the measurement layer is in operative association with the drop merging layer, wherein the merging layer and the measurement layer are separate non-integrated components of the nanocalorimeter.

2. The nanocalorimeter according to claim 1 wherein the operative contact between the thermal equilibration area and the temperature probe is actual physical contact.

3. The nanocalorimeter according to claim 1 wherein the operative contact between the thermal equilibration area and the temperature probe is of a sufficient proximity to obtain heat transfer without physical contact.

4. The nanocalorimeter according to claim 3 wherein sufficient proximity is between less than 1 micron to approximately 5 microns from the thermal equilibration area.

5. The nanocalorimeter according to claim 1 wherein the temperature probe is a cantilevered temperature probe, having a first end anchored to the substrate and a second end extending out of the plane of the substrate of the measurement layer.

6. The nanocalorimeter according to claim 1 wherein the temperature probe is a pillar temperature probe extending out of the substrate of the measurement layer.

7. The nanocalorimeter according to claim 1 wherein the drop merging layer further includes drop merging contact pads and electronic traces which interconnect the drop merging contact pads and the drop placement area.

8. The nanocalorimeter according to claim 1 wherein the temperature probe is in operative contact with the thermal equilibration area on a back side of the drop merging layer opposite the side of the drop placement area.

9. The nanocalorimeter according to claim 1 wherein the temperature probe is in operative contact with the thermal equilibration area on a same side of the drop merging layer as the drop placement area.

10. The nanocalorimeter according to claim 1 wherein the temperature probe includes one of a thermistor, a thermocouple or a thermopile.

11. The nanocalorimeter according to claim 10 wherein the thermistor is a vanadium oxide thermistor.

12. The nanocalorimeter according to claim 1 further including a cap layer in operative association with the drop merging layer.

13. A nanocalorimeter comprising:
    a drop merging layer, including a thermally insulating film bonded on a rigid substrate having drop merging areas for placement of drops where drop manipulation is performed, and thermal equilibration areas;
    a measurement layer including cantilever temperature probes, wherein the measurement layer is reusable, the cantilever temperature probes configured for operative contact with the thermal equilibration areas to measure temperature; and
    a cap layer to provide evaporation control in the drop merging layer wherein the merging layer, the measurement layer, and the cap layer are separate non-integrated components of the nanocalorimeter.

14. The nanocalorimeter according to claim 13, wherein the cantilever temperature probes are designed to have resistance concentrated in a tip region of the cantilever temperature probes.

15. A method of performing measurement operations using a non-integrated nanocalorimeter device, the method comprising:
   obtaining a drop merging layer including, a drop placement area for holding drops to be merged, and a thermal equilibration area;
   obtaining a measurement layer including, a substrate, and a temperature probe formed on the substrate, wherein the temperature probe extends out of the surface of the substrate, wherein the merging layer and the measurement layer are separate non-integrated components of the nanocalorimeter; and
   bringing the drop merging layer and the measurement layer into operative association, wherein the temperature probe and the thermal equilibration area are placed in operative contact.

16. The method according to claim 15 further including removing the drop merging layer and the measurement layer from operative association.

17. The method according to claim 16 further including;
   providing a reference drop merging area on the drop merging layer including, a drop placement area for holding reference drops to be merged, and a thermal equilibration area;
   providing a second temperature probe on the substrate, wherein the second temperature probe extends out of the surface of the substrate; and
   bringing the reference drop merging area into operative association with the second temperature probe on the measurement layer, wherein the second temperature probe is moved into operative contact with the thermal equilibration area of the reference drop merging area.

18. The method according to claim 15 wherein the step of bringing the drop merging layer and the measurement layer into operative association includes having the temperature probe in operative contact with the thermal equilibration area on a back side of the drop merging layer.

19. The method according to claim 15 wherein the step of bringing the drop merging layer and the measurement layer into operative association includes having the temperature probe come into operative contact with the thermal equilibration area on a front side of the drop merging layer.

20. The nanocalorimeter of claim 1, further comprising a second drop merging area configured to be placed in operative association with the measurement layer when the drop merging layer is in operative association with the measurement layer.

* * * * *